(12) United States Patent
Yajima et al.

(10) Patent No.: US 6,732,546 B1
(45) Date of Patent: May 11, 2004

(54) PRODUCT METHOD OF SYNTHETIC SILICA GLASS AND THERMAL TREATMENT APPARATUS

(75) Inventors: Shouji Yajima, Sagamihara (JP); Hiroyuki Hiraiwa, Yokohama (JP); Yasuji Ishida, Kanagawa-ken (JP)

(73) Assignee: Nikon Corporation, Tokyo (JP)

(*) Notice: Subject to any disclaimer, the term of this patent is extended or adjusted under 35 U.S.C. 154(b) by 423 days.

(21) Appl. No.: 09/806,236
(22) PCT Filed: Aug. 11, 2000
(86) PCT No.: PCT/JP00/05412
§ 371 (c)(1), (2), (4) Date: Mar. 28, 2001
(87) PCT Pub. No.: WO01/12566
PCT Pub. Date: Feb. 22, 2001

(30) Foreign Application Priority Data

Aug. 12, 1999 (JP) .......................... P11-228197

(51) Int. Cl.[7] ................................. C03B 19/06
(52) U.S. Cl. .................... 65/17.4; 65/17.6; 65/111; 65/117
(58) Field of Search ................ 65/17.6, 17.4, 65/63, 111, 112, 117, 32.1, 413, 424, 425; 423/335, 336, 337

(56) References Cited

U.S. PATENT DOCUMENTS

| | | | |
|---|---|---|---|
| 5,707,908 A | | 1/1998 | Komine et al. |
| 5,908,482 A | * | 6/1999 | Komine et al. ............... 65/17.6 |
| 6,143,676 A | * | 11/2000 | Ohashi et al. ................. 501/54 |
| 6,189,339 B1 | * | 2/2001 | Hiraiwa ........................ 65/17.3 |
| 6,339,033 B2 | * | 1/2002 | Jinbo et al. ................... 501/54 |
| 6,442,973 B1 | * | 9/2002 | Komine et al. ............... 65/17.4 |
| 2003/0115905 A1 | * | 6/2003 | Kuhn et al. ................... 65/17.6 |

FOREIGN PATENT DOCUMENTS

| | | | | |
|---|---|---|---|---|
| EP | 0401845 | * | 12/1990 | ............ G02B/1/00 |
| JP | 62-235223 A | | 10/1987 | |
| JP | 6-166527 A | | 6/1994 | |
| JP | 7-113902 A | | 5/1995 | |
| JP | 7-247132 A | | 9/1995 | |
| JP | 8-104532 A | | 4/1996 | |
| JP | 8-107060 A | | 4/1996 | |
| JP | 10-279322 A | | 10/1998 | |
| JP | 11-209134 A | | 8/1999 | |
| WO | WO 00/41226 A1 | | 7/2000 | |
| WO | WO 00/58761 A1 | | 10/2000 | |
| WO | WO 01/02311 A1 | | 1/2001 | |

* cited by examiner

Primary Examiner—Steven P. Griffin
Assistant Examiner—Carlos Lopez
(74) Attorney, Agent, or Firm—Oliff & Berridge PLC

(57) ABSTRACT

A production method of synthetic silica glass according to the present invention comprises a first step of ejecting a silicon compound and a combustion gas containing oxygen and hydrogen from a burner to effect hydrolysis of the silicon compound in oxyhydrogen flame to produce fine particles of silica glass, and thereafter depositing and vitrifying the fine particles of silica glass on a target opposed to the burner to obtain a synthetic silica glass ingot; a second step of heating the synthetic silica glass ingot or the like obtained in the first step up to a first retention temperature of not less than 900° C., retaining the ingot or the like at the first retention temperature, and cooling the ingot or the like at a temperature decrease rate of not more than 10° C./h down to a temperature of not more than 500° C.; and a third step of heating the synthetic silica glass ingot or the like obtained in the second step up to a second retention temperature of not less than 500° C. nor more than 1100° C., retaining the ingot or the like thereat, and thereafter cooling the ingot or the like at a temperature decrease rate of not less than 50° C./h down to a temperature 100° C. lower than the second retention temperature.

4 Claims, 22 Drawing Sheets

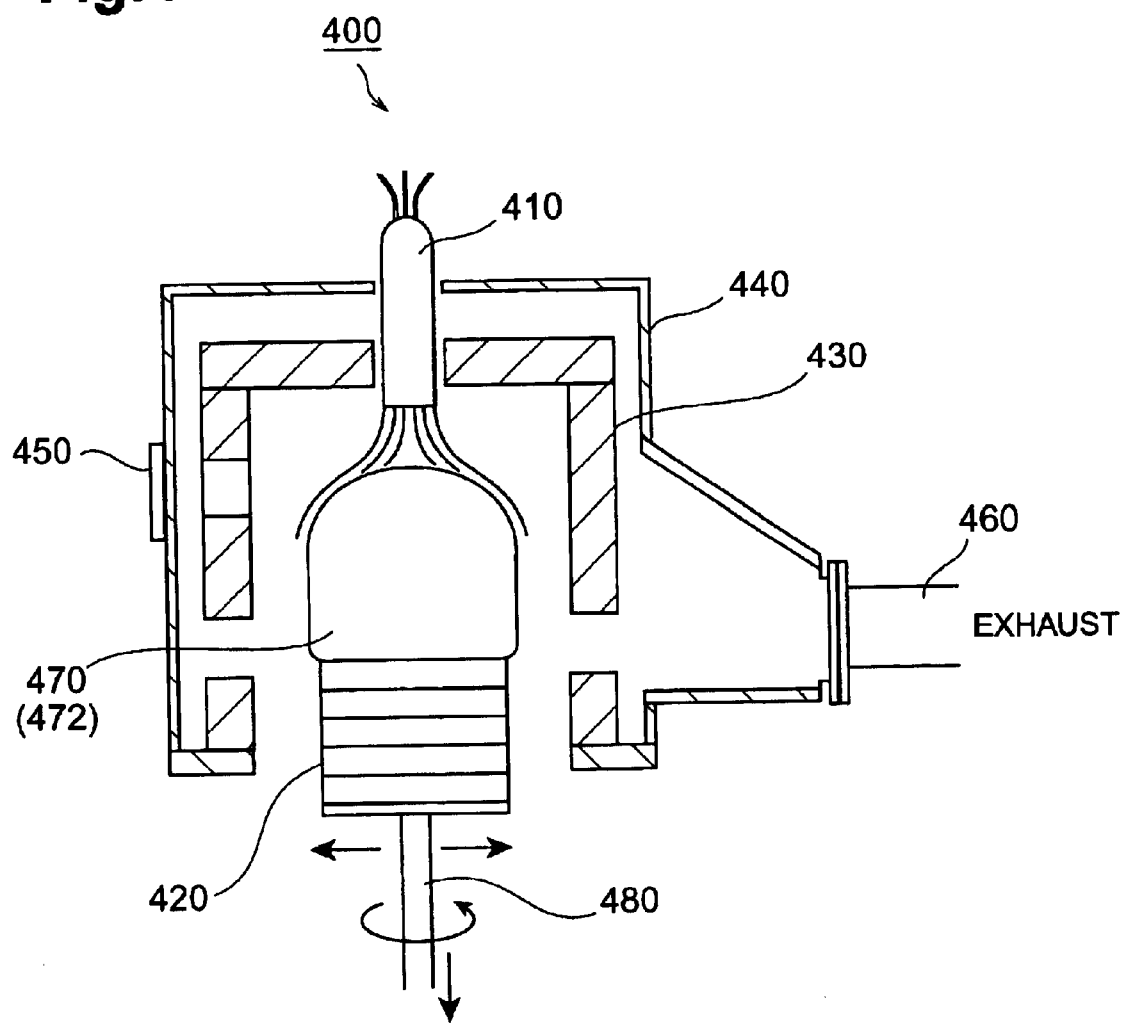

PRODUCT METHOD OF SYNTHETIC SILICA GLASS AND THERMAL TREATMENT APPARATUS

TECHNICAL FIELD

The present invention relates to a production method of synthetic silica glass and a thermal treatment apparatus and, more particularly, to a method of producing synthetic silica glass useful as a material for optical components and others used together with ultraviolet lasers, and a thermal treatment apparatus used therein.

BACKGROUND ART

Projection exposure systems (steppers) having the structure as illustrated in FIG. 22A and FIG. 22B have been used heretofore in the photolithography technology for printing a microscopic pattern of an integrated circuit on a wafer of silicon or the like.

In the projection exposure apparatus illustrated in FIG. 22A, light from a light source 601 such as a mercury arc lamp or the like is collected by an ellipsoidal mirror 602 and thereafter the light is converted into a collimated beam by a collimator lens 603. Then this collimated beam travels through a fly's eye lens 604 consisting of an assembly of optical elements 604a of a rectangular cross section as illustrated in FIG. 22B, to form a plurality of light source images on the exit side thereof. An aperture stop 605 having a circular aperture is disposed at this light source image position. Beams from the plurality of light source images are condensed by a condenser lens 606 to uniformly illuminate a reticle R as an object to be illuminated, on a superimposed basis.

A pattern on the reticle R under the uniform illumination by the illumination optical system as described above is projected and printed on a wafer W coated with a resist by a projection optical system 607 consisting of a plurality of lenses. This wafer W is mounted on a wafer stage WS, which is arranged to move two-dimensionally, and the projection exposure apparatus of FIG. 22A carries out the exposure in the so-called step-and-repeat method in which after completion of exposure in one shot area on the wafer, the wafer stage is two-dimensionally moved in order for exposure in a next shot area.

Another method proposed in recent years is a scanning exposure method capable of transferring the pattern of the reticle R onto the wafer W at high throughputs by illuminating the reticle R with a beam of rectangular shape or arcuate shape and scanning the reticle R and the wafer W arranged in conjugate relation with respect to the projection optical system 507, in a certain direction.

In the field of the projection exposure apparatus having such structure, there are desires for higher resolution with recent increase in integration density of LSI (large scale integration). Explaining this with an example of DRAM (dynamic random access memory) out of VLSI (very large scale integration) being a kind of LSI, the capacity thereof increases with development from LSI to VLSI in the following manner; 1K→256K→1M→4M→16M→64M→256M→1G. With this increase in the capacity, the processing line width of patterns required of the projection exposure apparatus decreases as 10 $\mu$m→2 $\mu$m→1$\mu$m→0.8 $\mu$m→0.5 $\mu$m→0.35 $\mu$m→0.25 $\mu$m→0.18 $\mu$m, respectively.

In order to enhance the resolution of the projection exposure apparatus, the optical members used in their optics need to have high transmittances for the exposure light used. This is because the optics of the projection exposure apparatus are composed of combination of many optical members and even if an optical loss per lens is small accumulation of such losses in the number of optical members used will lead to great decrease in the total transmittance. If optical members with low transmittances are employed they will absorb the exposure light to increase temperatures of the optical members and make refractive indexes inhomogeneous and polished surfaces thereof will undergo deformation because of local thermal expansion of the optical members. This will cause degradation of optical performance.

On the other hand, in the case of projection optical systems, there are demands for high homogeneity of refractive indexes of the optical members in order to obtain finer and clearer projection exposure patterns. This is because the dispersion of refractive indexes causes a lead or lag of light and this largely affects the imaging performance of the projection optical system.

Therefore, silica glass or calcium fluoride crystals with high transmittances for the ultraviolet light and with excellent homogeneity are generally used as materials for the optical members used in the optics of the projection exposure apparatus utilizing the ultraviolet light (of the wavelengths not more than 400 nm). Particularly, in the projection exposure apparatus with the excimer laser used in volume production lines of large capacity VRAM of not less than 16M, 0.25 $\mu$m microprocessors, and so on, synthetic silica glass of high purity is used as a material of optical elements for ultraviolet lithography (lens elements used in the illumination optical system or in the projection optical system).

The flame hydrolysis (also called a direct process) is known as a production method of synthetic silica glass. The flame hydrolysis is a method of ejecting a silicon compound as a source material and a combustion gas containing oxygen and hydrogen from a burner to burn the silicon compound in oxyhydrogen flame, thereafter depositing resultant fine particles of silica glass on a target opposed to the burner, and, at the same time as it, vitrifying the silica glass particles to obtain an ingot form of synthetic silica glass.

In general, the flame hydrolysis employs a fabrication system having the structure similar to the so-called Verneuil furnace and the synthesis is carried out with maintaining the in-system temperature at high temperatures of not less than 1000° C. The ingot form of silica glass obtained in this method is quickly cooled from the high temperature region of not less than 1000° C. to ordinary temperatures by natural cooling, is then subjected to cutting and rounding if necessary, and thereafter is subjected to a thermal treatment step of annealing (slow cooling treatment) or the like, thereby yielding a block material. The block material thus obtained is inspected as to radial index homogeneity, thereafter is processed in lens shape, and is further coated with a coating, so as to be able to be used as an optical member for ultraviolet lithography.

Meanwhile, decrease in wavelengths of light sources used for attainment of higher resolution has been proposed in recent years in the projection exposure apparatus, and, for example, the wavelengths have been decreased to the KrF excimer laser (248 nm) and the ArF excimer laser (193 nm), in place of the g-line (436 nm) and the i-line (365 nm) which have been utilized heretofore.

Since the projection exposure systems using such excimer lasers of short wavelengths are intended for attainment of finer mask patterns, their optics are constructed using materials with higher properties as to the homogeneity of transmittance and refractive index.

There were, however, cases wherein a desired resolution was not attained even if the optics were fabricated by assembling a plurality of materials with high and homogeneous transmittances and refractive indexes.

DISCLOSURE OF THE INVENTION

The present invention has been accomplished in view of the problem of the prior art described above and an object of the invention is to provide a production method of synthetic silica glass useful as a material for the optical members (optical elements) and others forming the optics of the projection optical apparatus (steppers) and capable of attaining sufficiently high imaging performance in the optics and sufficiently high resolution in the projection exposure apparatus even in use with a light source of a short wavelength such as the KrF excimer laser or the ArF excimer laser, and to provide a thermal treatment apparatus used therein.

The inventors have conducted intensive and extensive research in order to accomplish the above object and first found that the imaging performance of the projection optical system and the resolution of the projection exposure apparatus were affected by the optical members and that the imaging performance close to designed performance of the projection optical system and the resolution close to the designed performance of the projection exposure apparatus were able to be attained if the magnitude of double refraction of the optical members, i.e., their birefringence values (absolute values) were not more than 2 nm/cm and if distributions of birefringence values of the optical members were of center symmetry, which is disclosed in Japanese Patent Application Laid-Open No. H08-107060.

With increasing demands for much higher resolution of the projection exposure apparatus, however, there were cases wherein even employment of the above conventional design concept resulted in failure to attain good imaging performance of the projection optical system and good resolution of the projection exposure apparatus when the exposure light was light of shorter wavelengths or when the optical members were of large aperture and large thickness.

Then the inventors have conducted further research and found out that the cause of the failure to attain the projection optical system and the projection exposure apparatus with desired optical performance even with use of the optical members with good transmittance and good index homogeneity was that the optical members had their respective birefringence value distributions different from each other, the different birefringence value distributions were added up in the total optical system when a plurality of optical members were assembled into the projection optical system, and it resulted in disturbing the wavefront of light in the entire optical system and thus greatly affecting the imaging performance of the projection optical system and the resolution of the projection exposure apparatus.

Namely, the evaluation of birefringence values of optical members heretofore was discussed simply by levels of magnitudes (absolute values) thereof and there was no conception to consider the distributions of birefringence values of the optical members. For example, it was common recognition to those skilled in the art that the birefringence values of silica glass members were evaluated by measuring birefringence values at several points near 95% of the diameter of each member and using a maximum thereof as a birefringence value of that member. The inventors, however, discovered that actual distributions of birefringence values were nonuniform, based on detailed measurements to measure distributions of birefringence values of silica glass members.

It was thus verified that even with use of silica glass members with high homogeneity of index the influence of double refraction in the members was not evaluated well by simply managing maximums of birefringence values in the members and that it was very difficult to attain an optical system with desired performance, particularly, in the case of combination of plural members.

Since the double refraction of the entire optical system composed of a plurality of optical members was unable to be evaluated by simply expressing it using only the magnitudes (absolute values) of birefringence values of the individual optical members as described above, the inventors introduced the concept of birefringence values taking account of the direction of the fast axis (i.e., the concept of signed birefringence values) and investigated in detail the influence on optical systems from nonuniform distribution of signed birefringence values of synthetic silica glass. It was found from the investigation that it was difficult to homogenize the distribution of signed birefringence values sufficiently by the conventional annealing known as a means for improving the dispersion of double refraction in production of synthetic silica glass and that if an optical system was constructed of a plurality of optical members of the synthetic silica glass obtained in this way the signed birefringence values would be added up to cause the negative effect on the optical system. Then the inventors discovered that the distribution of signed birefringence values of synthetic silica glass was homogenized well by a specific thermal treatment on the synthetic silica glass obtained by the flame hydrolysis in the production of synthetic silica glass, thus completing the present invention.

Specifically, a production method of synthetic silica glass according to the present invention comprises:

a first step of ejecting a silicon compound and a combustion gas containing oxygen and hydrogen from a burner to hydrolyze the silicon compound in oxyhydrogen flame to generate fine particles of silica glass and thereafter depositing and vitrifying the silica glass particles on a target opposed to the burner to obtain a synthetic silica glass ingot;

a second step of heating the synthetic silica glass ingot obtained in the first step or a synthetic silica glass obtained by cutting of the synthetic silica glass ingot, up to a first retention temperature within a range of not less than 900° C., retaining the ingot or the block at the first retention temperature for a predetermined time, and thereafter cooling the ingot or the block at a temperature decrease rate of not more than 10° C./h down to a temperature of not more than 500° C.; and a third step of heating the synthetic silica glass ingot or the synthetic silica glass block obtained in the second step up to a second retention temperature within a range of not less than 500° C. nor more than 1100° C., retaining the ingot or the block at the second retention temperature for a predetermined time, and thereafter cooling the ingot or the block at a temperature decrease rate of not less than 50° C./h down to a temperature 100° C. lower than the second retention temperature.

The reason why the distribution of signed birefringence values of synthetic silica glass became homogenized by the production method of the present invention was not clear yet, but the inventors deduce the reason as follows.

Namely, the annealing in the conventional production methods of synthetic silica glass is the treatment of heating the synthetic silica glass block mounted on a rotatable table by a heater set on the wall surface and thereafter cooling it at a temperature decrease rate as small as possible, as described in Japanese Patent Application Laid-Open No. H07-113902. It is considered that this method is able to improve the inhomogeneity of distribution of birefringence values caused by temperature distribution in the synthetic silica glass in the cooling process, but it is difficult to improve the inhomogeneity of distribution of birefringence values caused by thermal history during the synthesis, distribution of impurities, and so on, by the above method.

In contrast with it, the inventors infer that the production method of the present invention is capable of improving the inhomogeneity of distribution of birefringence values due to the temperature distribution in the synthetic silica glass in the cooling process and also improving the inhomogeneity of distribution of signed birefringence values due to the thermal history during the synthesis, the distribution of impurities, and so on, by the steps of heating the synthetic silica glass ingot obtained in the first step or the synthetic silica glass block cut out of the synthetic silica glass ingot up to the first retention temperature in the range of not less than 900° C., retaining the ingot or the block at the first retention temperature for the predetermined time, then cooling the ingot or the block at the temperature decrease rate of not more than 10° C./h down to the temperature of not more than 500° C., further heating the ingot or the block up to the second retention temperature in the range of not less than 500° C. nor more than 1100° C., retaining it at the second retention temperature for the predetermined time, and thereafter cooling it at the temperature decrease rate of not less than 50° C./h down to the temperature 100° C. lower than the second retention temperature.

In the production method of the present invention, the temperatures in the respective processes of heating, retaining, and cooling mean temperatures on the surface of synthetic silica glass.

In the production method of the present invention, the temperature decrease rates mean average temperature decrease rates between retention temperature and predetermined temperature. Specifically, in the second step according to the present invention, the temperature decrease rate is an average temperature decrease rate in the cooling step from the first retention temperature in the range of not less than 900° C. to the predetermined temperature of not more than 500° C. on the other hand, in the third step according to the present invention, the temperature decrease rate is an average temperature decrease rate in the cooling step from the second retention temperature in the range of not less than 500° C. nor more than 1100° C. to the temperature 100° C. lower than the second retention temperature, and where the time necessary for the temperature decrease of 100° C. after the start of cooling is expressed as t[h], the temperature decrease rate is given by the following equation:

(temperature decrease rate [° C./h])=100/t.

In the production method of the present invention, it is preferable that the temperature decrease rate in the third step be not less than 70° C./h nor more than 800° C./h. When the cooling is implemented at the temperature decrease rate in this range, the distribution of signed birefringence values of synthetic silica glass obtained tends to exhibit better homogeneity.

In the production method of the present invention, it is preferable to use a common furnace in the second step and the third step and carry out the third step continuously without taking the synthetic silica glass ingot or the synthetic silica glass block out of the furnace, after the second step. When the same furnace is used in the second step and the third step and when the third step is carried out continuously without taking the synthetic silica glass ingot or the synthetic silica glass block out of the furnace, after the second step, there are tendencies to be able to efficiently produce the synthetic silica glass with a sufficiently homogenous distribution of signed birefringence values and widen the scope of selection of thermal treatment conditions.

Further, in the production method of the present invention, the third step is preferably a step of successively carrying out the heating, retaining, and cooling with rotating the synthetic silica glass ingot or the synthetic silica glass block. When the heating, retaining, and quick cooling steps are successively carried out with rotating the silica glass in this way, there are tendencies to present better homogeneity of the distribution of signed birefringence values of synthetic silica glass.

A thermal treatment apparatus of the present invention comprises:
  a furnace made of a refractor;
  a stage capable of carrying synthetic silica glass and moving between a first stage position for letting the synthetic silica glass into the furnace and a second stage position for letting the synthetic silica glass out of the furnace;
  a heat generator for heating the synthetic silica glass; and
  a driving portion connected to the stage, for moving the stage between the first stage position and the second stage position.

In the thermal treatment apparatus of the present invention, the stage carrying the synthetic silica glass is first moved to the first stage position so as to let the synthetic silica glass into the furnace, and thereafter the synthetic silica glass can be heated and retained at a desired temperature for a desired time by the heat generator. After that, the stage is moved to the second stage position, whereby the synthetic silica glass can be readily taken out of the furnace. Accordingly, when the thermal treatment apparatus of the present invention is applied to the aforementioned production method of the present invention, the thermal treatment including the heating, retaining, and cooling of synthetic silica glass under the desired conditions can be carried out efficiently and surely, so that it becomes feasible to efficiently and surely yield the synthetic silica glass with sufficiently homogeneous distribution of signed birefringence values.

The thermal treatment apparatus of the present invention is preferably constructed to further comprise a rotational driving portion for rotating the stage. When the thermal treatment according to the present invention is carried out with rotating the stage, the distribution of birefringence values of synthetic silica glass obtained tends to exhibit better homogeneity.

Here the notion of signed birefringence value according to the present invention will be described.

The signed birefringence value is a birefringence value with a sign assigned in consideration of the direction of the fast axis defined in the index ellipsoid on the occasion of determining birefringence values of optical members.

More specifically, in a plane normal to the optical axis, centered around an intersection with the optical axis of an optical member, an area subject to circular illumination with a beam is defined as an effective section of an approximate circle, the sign of plus is given to a birefringence value measured when a radial direction from the center being the intersection with the optical axis of the optical member is parallel to the direction of the fast axis in a microregion at a birefringence measuring point on the effective section, and the sign of minus to a birefringence value when perpendicular.

The above way of assignment of the signs to the birefringence values can also be applied to cases wherein a plurality of beams are radiated into the plane normal to the optical axis, centered around the intersection with the optical axis of the optical member. In such cases, the sign of plus is assigned to a birefringence value measured when a radial direction from the center being the intersection with the optical axis of the optical member is parallel to the direction of the fast axis in a microregion around a birefringence measuring point on each of effective sections illuminated with the plurality of beams, and the sign of minus when perpendicular.

Further, the above way of assignment of the signs to the birefringence values can also be applied to cases wherein a beam of the shape other than the circular section, e.g., a beam of a ring section or a elliptic section is radiated into the plane normal to the optical axis, centered around the intersection with the optical axis of the optical member. In such cases, the sign of plus is also assigned to a birefringence value measured when a radial direction from the center being the intersection with the optical axis of the optical member is parallel to the direction of the fast axis in a microregion around a birefringence measuring point on the effective section illuminated with the beam, and the sign of minus when perpendicular.

In the following description, we will describe cases wherein the sign of plus is assigned to a birefringence value measured when a radial direction from the center being the intersection with the optical axis of the optical member is parallel to the direction of the fast axis in a microregion around a birefringence measuring point on an effective section illuminated with light, and the minus sign when perpendicular.

The birefringence values will be described below in further detail with reference to FIG. 1A, FIG. 1B, FIG. 2A, FIG. 2B, FIG. 3A, and FIG. 3B.

FIG. 1A is a schematic diagram to show directions of the fast axis at birefringence measuring points $P_{11}$, $P_{12}$, $P_{13}$, and $P_{14}$ located at respective distances $r_1$, $r_2$, $r_3$, and $r_4$ from the center O on the effective section of an optical member $L_1$. For convenience' sake of description, the birefringence measuring points $P_{11}$ to $P_{14}$ are set on a straight line $Q_1$ passing the center $O_1$ and extending along a radial direction in this figure. In the figure, the size of a microregion indicated by a circle at each measuring point is equivalent to an optical path difference at each measuring point. Directions of segments $W_{11}$, $W_{12}$, $W_{13}$, and $W_{14}$ in these microregions represent directions of the fast axis. Since the directions of the fast axis at the measuring points $P_{11}$ to $P_{14}$ all are parallel to the direction of the straight line $Q_1$, i.e., to the radial direction, the birefringence values at the measuring points $P_{11}$ to $P_{14}$ are expressed all with the plus sign. The distribution in the radial direction of signed birefringence values $A_{11}$, $A_{12}$, $A_{13}$, and $A_{14}$ at the measuring points $P_{11}$ to $P_{14}$ illustrated in FIG. 1A, obtained as described above, is depicted, for example, as a profile of FIG. 1B.

FIG. 2A is a schematic diagram to show directions of the fast axis at birefringence measuring points $P_{21}$, $P_{22}$, $P_{23}$, and $P_{24}$ located at respective distances $r_1$, $r_2$, $r_3$, and $r_4$ from the center $O_2$ on the effective section of another optical member $L_2$, similar to FIG. 1A. In this case, since the directions of the fast axis, $W_{21}$, $W_{22}$, $W_{23}$, and $W_{24}$, all are perpendicular to the direction of the straight line $Q_2$, i.e., to the radial direction, the signed birefringence values $A_{21}$, $A_{22}$, $A_{23}$, and $A_{24}$ at the measuring points $P_{21}$ to $P_{24}$ are expressed all with the minus sign. The distribution in the radial direction of the signed birefringence values $A_{21}$ to $A_{24}$ at the measuring points $P_{21}$ to $P_{24}$ illustrated in FIG. 2A, obtained in this way, is depicted, for example, as a profile of FIG. 2B.

FIG. 3A is a schematic diagram to show directions of the fast axis at birefringence measuring points $P_{31}$, $P_{32}$, $P_{33}$, $P_{34}$ and $P_{35}$ located at respective distances $r_1$, $r_2$, $r_3$, $r_4$, and $r_5$ from the center O on the effective section of another optical member $L_3$, similar to FIG. 1A. In this case, the directions of the fast axis, $W_{31}$, $W_{32}$, $W_{33}$, $W_{34}$, and $W_{35}$, at the measuring points $P_{11}$ to $P_{14}$ are such that those at the measuring points $P_{31}$ to $P_{33}$ are parallel to the direction of the straight line $Q_3$, i.e., to the radial direction, but those at the measuring points $P_{33}$, $P_{34}$ are perpendicular to the radial direction. Therefore, the distribution in the radial direction of the signed birefringence values $A_{31}$ to $A_{35}$ at the measuring points $P_{31}$ to $P_{35}$ is depicted, for example, as a profile of FIG. 3B.

BRIEF DESCRIPTION OF THE DRAWINGS

FIG. 4 is an explanatory diagram to show an example of a synthesis furnace of silica glass ingot used in the present invention.

BEST MODE FOR CARRYING OUT THE INVENTION

Figure 1A:
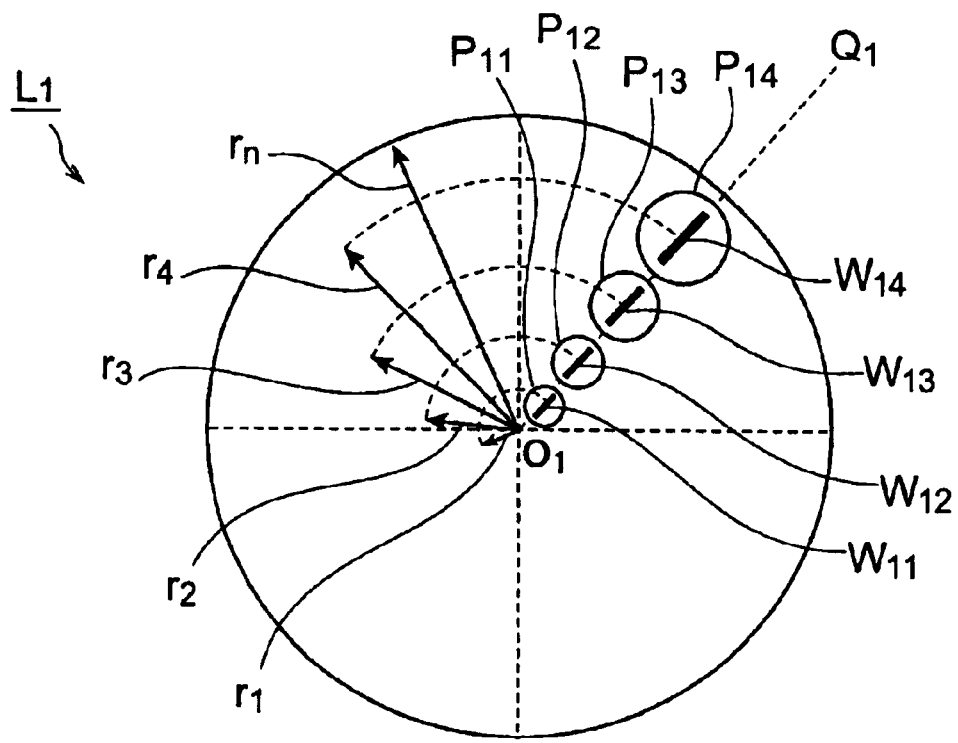
FIG. 1A is an explanatory diagram to show the notion of the signed birefringence values and FIG. 1B is a graph to show the distribution of signed birefringence values in the optical member illustrated in FIG. 1A.
Figure 1B:
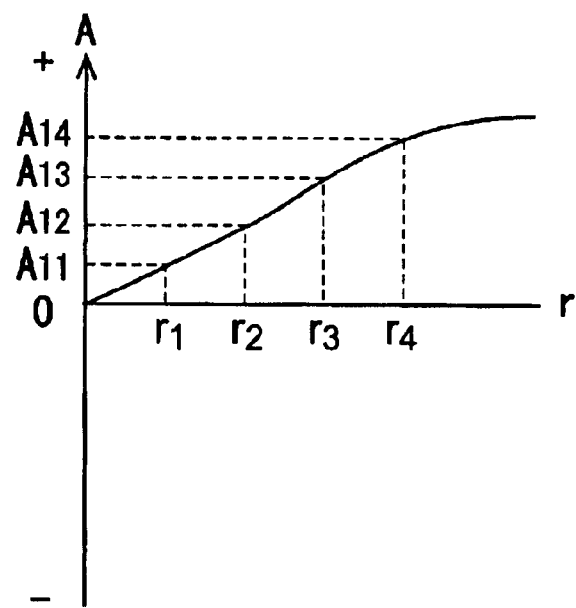

First, the production method of synthetic silica glass according to the present invention will be described.

In the production method of the present invention the first step is a step of ejecting a silicon compound and a combustion gas containing oxygen and hydrogen from a burner to hydrolyze the silicon compound in oxyhydrogen flame to generate fine particles of silica glass and thereafter depositing and vitrifying the silica glass particles on a target opposed to the burner to obtain a synthetic silica glass ingot, and this step can be carried out using the synthesis furnace illustrated in FIG. 4.

In FIG. 4, a burner 410 of silica glass having multi-tubular structure is installed to be suspended from the upper part of the synthesis furnace 400 with the distal end of the burner facing a target 420. The furnace wall is constructed of a frame 440 and a refractory 430 and is provided with a view port (not illustrated), an IR camera monitor window 450, and an exhaust system 460. The target 420 for formation of silica glass ingot is arranged in the lower part of the synthesis furnace 400, and the target 420 is connected through a support shaft 480 to an XY stage (not illustrated) located outside the furnace. The support shaft 480 is arranged rotatable by a motor and the XY stage is also arranged two-dimensionally movable in the X-axis direction and in the Y-axis direction by an X-axis servomotor and a Y-axis servomotor.

In the first step in the production method of the present invention, first, an oxygen-containing gas and a hydrogen-containing gas are ejected from the burner 410 and these are mixed to form oxyhydrogen flame. The silicon compound diluted with a carrier gas is ejected from the central part of the burner 410 into this flame, whereupon the hydrolysis of the silicon compound takes place to produce fine particles of silicon glass (soot). Here the silicon compound used in the present invention can be one selected from silicon chlorides such as $SiCl_4$, $SiHCl_3$, and so on; silicon fluorides such as $SiF_4$, $Si_2F_6$, and so on; organosilicon compounds including siloxanes such as hexamethyldisiloxane, octamethylcyclotetrasiloxane, tetramethylcyclotetrasiloxane, and so on, silanes such as methyltrimethoxysilane, tetraethoxysilane, tetramethoxysilane, and so on, and others; and $SiH_4$, $Si_2H_6$, and so on.

Then the silicon glass particles obtained in the above step are deposited onto the rotating and oscillating target 420 and are fused and vitrified, thereby obtaining a synthetic silica glass ingot. At this time, the upper part of the ingot is covered by the flame, and the target 420 is pulled down along the Z-direction while the position of the synthetic surface of the upper part of the ingot is always kept equidistant from the burner.

Since the ingot obtained in the first step is quickly cooled by stopping the supply of the combustion gas from the burner, it normally has a nonuniform distribution of birefringence values due to thermal shock inside.

In the production method of the present invention, the second and third steps described hereinafter are carried out, using the synthetic silica glass ingot obtained in the above first step, or a synthetic silica glass block cut in a desired size out of the ingot. The ingot obtained in the above first step has high rotational symmetry in the distribution of birefringence values and it facilitates correction by optical design for wavefront aberration due to index distribution. However, it is necessary to align the center of the ingot with the geometrical center of the block when the block is cut out of such an ingot.

In the production method of the present invention the second step is a step of heating the synthetic silica glass ingot obtained in the above first step or the synthetic silica glass block obtained by cutting of the synthetic silica glass ingot, up to a first retention temperature in the range of not less than 900° C., retaining the ingot or the block at the first retention temperature for a predetermined treatment time, and thereafter cooling it at a temperature decrease rate of not more than 10° C./h down to a temperature of not more than 500° C.

Here the first retention temperature is not less than 900° C. as described above and, preferably, not less than 1000° C. nor more than 1200° C. If the first retention temperature is less than 900° C. the homogenization will be insufficient for the distribution of birefringence values of synthetic silica glass. If the first retention temperature is over 1200° C. on the other hand, there will arise tendencies to induce change in the physical properties because of deterioration of the surface of synthetic silica glass and emission of gas containing hydrogen or the like.

The treatment time in the second step can be properly selected depending upon the first retention temperature and is preferably not less than 0.5 hour nor more than 5 hours. If the retention time is less than the lower limit the homogenization will tend to be insufficient for the distribution of birefringence values of synthetic silica glass. If the retention time is over the upper limit on the other hand, there will arise tendencies to fail to achieve the homogenizing effect of the distribution of birefringence values conforming to the treatment time and to induce change in the physical properties because of deterioration of the surface of synthetic silica glass and emission of the gas containing hydrogen or the like.

Further, in the second step the synthetic silica glass is cooled down to the temperature of not more than 500° C. as described above and, preferably, down to the temperature in the range of 400 to 450° C. If the temperature at the end of the cooling step is over the upper limit the homogenization will be insufficient for the distribution of birefringence values. If the temperature at the end of the cooling step is less than the lower limit on the other hand, the cooling will tend to take an excess time and lower the efficiency.

The temperature decrease rate in this cooling step is not more than 10° C./h as described above and, preferably, not less than 5° C./h nor more than 10° C./h. If the temperature decrease rate is over the upper limit the homogenization will be insufficient for the distribution of birefringence values. If the temperature decrease rate is less than the lower limit so as to effect slow cooling on the other hand there will arise tendencies to fail to achieve the homogenizing effect of birefringence values conforming to the temperature decrease rate and to result in decreasing the efficiency.

In the second step according to the present invention, after the synthetic silica glass is cooled down to the temperature of not more than 500° C., it may be subsequently cooled at a predetermined temperature decrease rate, or it may be naturally cooled without control of the temperature decrease rate. It is also possible to carry out the heating step in the third step immediately after the temperature of the synthetic silica glass reaches the predetermined temperature of not more than 500° C., as described hereinafter.

In the second step, there are no specific restrictions on the treatment method as long as the above conditions are met by the first retention temperature, the temperature at the end of the cooling step, and the temperature decrease rate; for example, the treatment can be carried out according to the method described in Japanese Patent Application Laid-Open No. H07-113902. The second step can be carried out using a well-known thermal treatment furnace, but it is preferable to use the thermal treatment apparatus of the present invention described hereinafter, because the second step and third step can be continuously performed, so as to increase the efficiency.

Then, the synthetic silica glass with well-homogenized distribution of signed birefringence values can be obtained by the third step in the production method of the present invention, i.e., by the step of heating the synthetic silica glass obtained in the second step up to a second retention temperature in the range of not less than 500° C. nor more than 1100° C., retaining it at the second retention temperature for a predetermined time, and thereafter cooling it at a temperature decrease rate of not less than 50° C./h down to a temperature 100° C. lower than the second retention temperature.

Here the second retention temperature is not less than 500° C. nor more than 1100° C. as described above, preferably not less than 800° C. nor more than 1000° C., and more preferably not less than 600° C. nor more than 900° C.

If the second retention temperature is less than 500° C. the homogenization will be insufficient for the distribution of signed birefringence values. If the second retention temperature is over 1100° C. on the other hand there will occur change in the physical properties because of deterioration of the surface of the synthetic silica glass and emission of the gas containing hydrogen or the like.

In the third step the retention time can be properly selected according to the second retention temperature and is preferably not less than ten minutes nor more than one hour. If the retention time is less than the lower limit the homogenization will tend to be insufficient for the distribution of birefringence values of synthetic glass. If the retention time is over the upper limit on the other hand there will arise tendencies to fail to achieve the homogenizing effect of birefringence values conforming to the retention time and to induce change in the physical properties because of deterioration of the synthetic silica glass surface and emission of the gas containing hydrogen or the like.

Further, the temperature at the end of the cooling step in the third step is the temperature determined by the second retention temperature, i.e., the temperature 100° C. lower than the second retention temperature. Specifically, it is not less than 400° C. nor more than 1000° C., preferably not less than 700° C. nor more than 900° C., and more preferably not less than 500° C. nor more than 800° C.

Moreover, the temperature decrease rate in the third step is not less than 50° C./h as described previously, preferably not less than 70° C./h nor more than 800° C./h, more preferably not less than 75° C./h nor more than 800° C./h, and still more preferably not less than 100° C./h nor more than 800° C./h. If the temperature decrease rate is less than the lower limit the homogenization will be insufficient for the distribution of birefringence values of synthetic silica glass. If the temperature decrease rate is over the upper limit on the other hand the synthetic silica glass will tend to become fragile.

In the third step according to the present invention, after the synthetic silica glass is cooled to the temperature 100° C. lower than the second retention temperature, it may be subsequently cooled at a predetermined temperature decrease rate, or it may be naturally cooled without control of the temperature decrease rate.

There are no specific restrictions on the cooling method of synthetic silica glass in the third step as long as the temperature decrease rate satisfies the above condition. Specifically, the cooling can be carried out by either of methods including the following methods (a) to (d):

(a) a method of cooling in the atmosphere;
(b) a method using particles not reacting with the silica glass in the range of room temperature to the retention temperature (e.g., fine particles mainly comprised of alumina ($Al_2O_3$), silica ($SiO_2$), or a mixture thereof);
(c) a method of applying an inert gas such as nitrogen or the like;
(d) a method of water cooling.

Among these, use of the method indicated by above (a) or (b) is preferable in that the homogenization can be effected efficiently and surely for the distribution of birefringence values of synthetic silica glass.

The third step in the production method of the present invention can be suitably carried out using the thermal treatment apparatus of the present invention described hereinafter.

Figure 5:
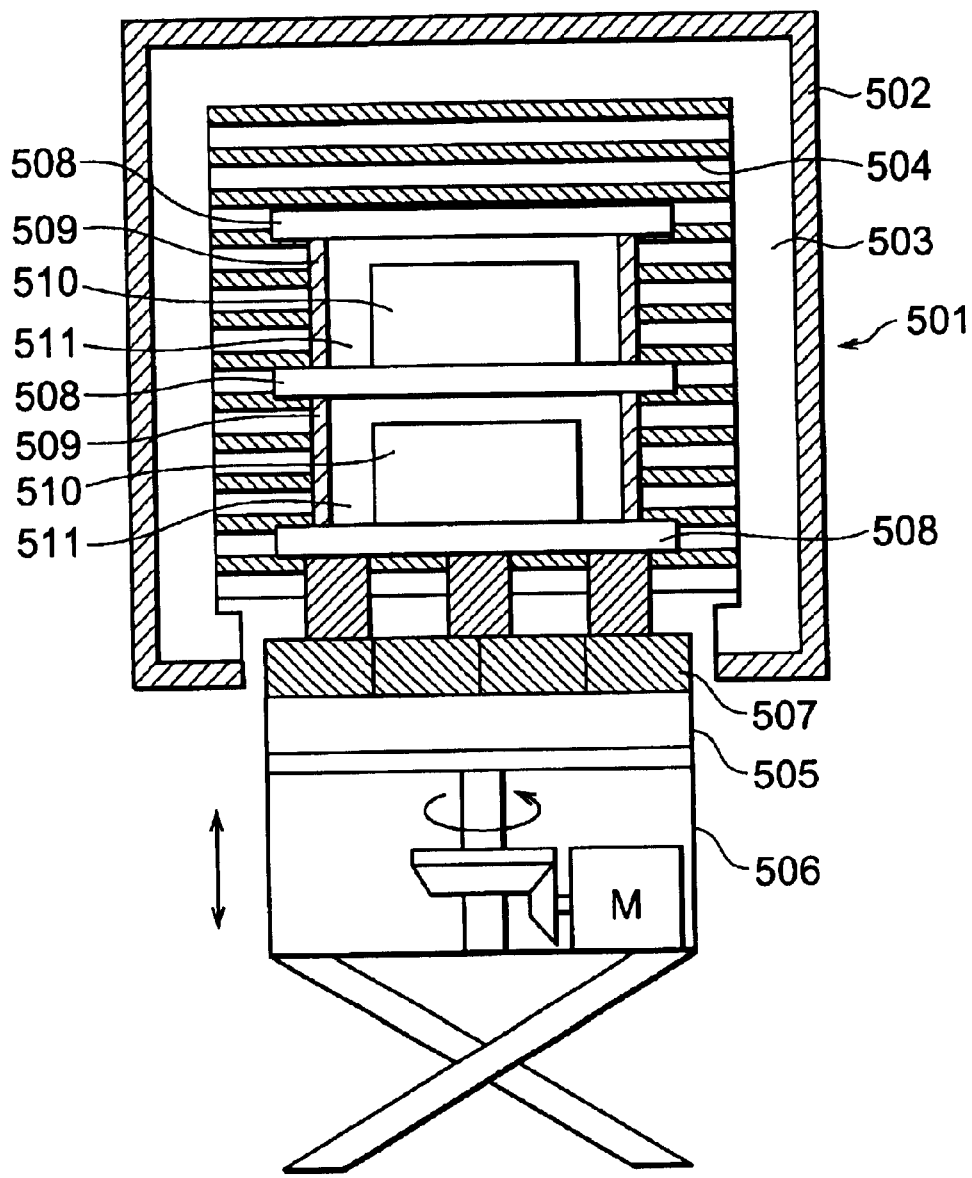
FIG. 5 is a an explanatory diagram to show a preferred embodiment of the thermal treatment apparatus of the present invention.

FIG. 5 is a schematic cross-sectional view to show a preferred embodiment of the thermal treatment apparatus of the present invention. In the thermal treatment apparatus of FIG. 5, a furnace 501 is constructed of a metal frame 502 and a refractory board 503 cemented to the inside of the frame 502, and a heat generator 504 for raising the temperature in the furnace 501 is embedded in the refractory board 503. The thermal treatment apparatus of FIG. 5 is provided with a stage 505 and the stage 505 can be moved between a first stage position for locating the synthetic silica glass 510 mounted on the stage 505 in the furnace 501 and a second stage position for taking the synthetic silica glass 510 out of the furnace 501, by a driving unit 506 having the jack type structure and equipped with an electromagnetic cylinder (not illustrated). Further, refractory brick 507, silica glass plates 508, and silica glass cylinders 509 are arranged on the stage 505, so that the synthetic silica glass 510 (ingot or block) as a sample can be accommodated in each sample chamber 511 composed of the silica glass plate 508 and the silica glass cylinder 509.

In the thermal treatment apparatus of FIG. 5 having this structure, the synthetic silica glass 510 is first set in the sample chambers 511, then the stage 505 is moved to the first stage position to. locate the synthetic silica glass 510 in the furnace, the temperature in the furnace 501 is increased by the heat generator 504 to heat the synthetic silica glass 510, and the synthetic silica glass 510 is retained at a predetermined treatment temperature for a predetermined treatment time. The surface temperature of the synthetic silica glass can be controlled by use of the heat generator 504 and a temperature controller (not illustrated) electrically connected to a thermocouple (not illustrated).

Then the stage 505 is moved to the second stage position by the driving unit 506 and the synthetic silica glass 510 is taken out of the furnace 501 to be cooled. In this cooling Step, the cooling can be implemented efficiently and surely by (a) the method of cooling in the atmosphere, or (b) the method using the particles not reacting with the silica glass in the range of room temperature to the retention temperature (e.g., fine particles mainly comprised of alumina ($Al_2O_3$), silica ($SiO_2$), or the mixture thereof).

In the present invention the aforementioned steps may be carried out with the synthetic silica glass 510 being mounted directly on the stage 505, but the space in the furnace can be effectively utilized with use of the silica glass plates 508 and silica glass cylinders 509 as illustrated in FIG. 5. When the cooling is carried out using the above method of (b), the cooling of the synthetic silica glass can be effected readily and surely by charging the fine particles into each sample chamber 511 after removing the silica glass plate 508 serving as a lid. Further, if a small support member of a refractory is placed between the synthetic silica glass 510 and the silica glass plate 508 so as to expose the lower surface of synthetic silica glass 510 as much as possible, the uniformity of temperature of synthetic silica glass can be enhanced in the above heating and cooling processes.

The thermal treatment apparatus of the present invention is preferably constructed to further comprise a rotational driving unit 512 for rotating the stage 505, as illustrated in FIG. 5. When the thermal treatment is carried out with rotating the stage by the rotational driving unit, the distribution of birefringence values of resultant synthetic silica glass tends to be better homogenized.

Figure 6A:
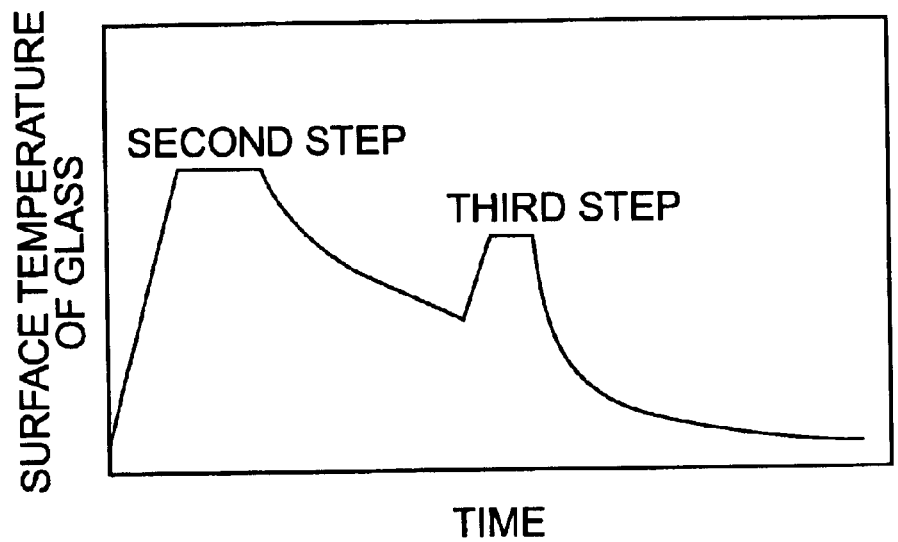
FIG. 6A and FIG. 6B are graphs to show a correlation between surface temperature of synthetic silica glass and time in the case where the second step and third step according to the present invention are carried out continuously.
Figure 6B:
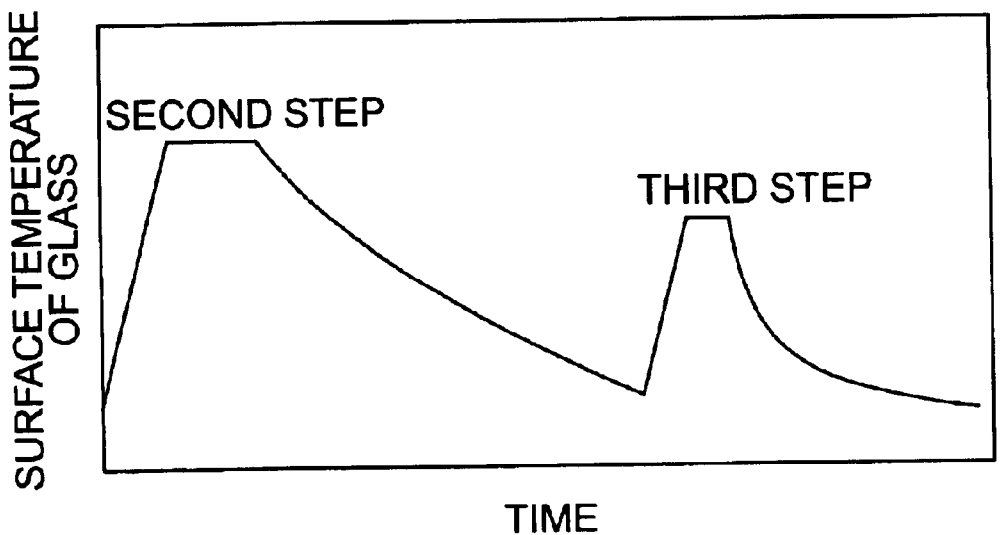

The thermal treatment apparatus of the present invention described above can also be applied to the second step in the production method of the present invention. It is preferable to use the same furnace in the second step and in the third step and thus carry out the third step continuously without taking the synthetic silica glass ingot or the synthetic silica glass block out of the furnace after the second step, because it expands the scope of selection of the thermal treatment conditions and also increases the efficiency. For example, the thermal treatment can be performed under such desired conditions that the third step is started in the middle of the cooling process in the second step as illustrated in FIG. 6A or that the third step is started after completion of the cooling process in the second step as illustrated in FIG. 6B. Further, it is particularly preferable to select the thermal treatment conditions, based on the preliminarily obtained correlation between thermal treatment conditions and homogenizing effects of distribution of birefringence values, and carry out the second step and third step continuously, in that both the accuracy and efficiency are achieved in higher levels in the homogenization of distribution of birefringence values of synthetic silica glass.

Methods of measuring the signed birefringence values of the synthetic silica glass obtained in this way include the phase modulation method, the rotary analyzer method, the phase compensation method, and so on.

In the phase modulation method the optical system is composed of a light source, a polarizer, a phase modulation element, a sample, and an analyzer. An He—Ne laser or a laser diode is used as the light source, and a photoelastic transducer as the phase modulation element, respectively. Light from the light source is converted into linearly polarized light by the polarizer to be incident to the phase modulation element. The light from the phase modulation element projected onto the sample is modulated light continuously changing its states of polarization in such a manner as linearly polarized light→circularly polarized light→linearly polarized light by the element. In the measurement, the direction of the fast axis and the magnitude of retardation are determined in such a way that a peak of output of a detector is found with rotating the sample about the light incident to a measuring point on the sample and the amplitude at that time is measured. If the Zeeman laser is used as the light source the measurement can be carried out without rotating the sample. The phase shift method or the optical heterodyne interferometry can also be applied in the present invention.

In the rotary analyzer method the device configuration is such that a sample between a light source and a photodetector is interposed between a polarizer and a rotary analyzer, and a signal from the detector is measured with rotating the analyzer placed behind the sample to obtain a phase difference between a maximum and a minimum of the signal from the detector.

In the phase compensation method there are arranged a light source, a polarizer, a sample, a phase compensator, an analyzer, and a photodetector. The polarizer and analyzer are placed with their respective axes perpendicular to each other. Linearly polarized light incident to the sample is converted into elliptically polarized light because of double refraction of the sample, but it is again converted into linearly polarized light by adjustment of the phase compensator, so as to make the signal substantially zero at the photodetector. Then a phase compensation value at the best extinction becomes a quantity of birefringence.

When the sample has a sufficient thickness, it is possible to obtain the birefringence values by a simple method of placing each of a sample to be measured and a standard sample in a crossed-Nicols optical system and comparing them.

A measured value of birefringence is given the sign of + (plus) when the direction of the fast axis and a radial direction of a member are parallel, but the sign of − (minus)

in the perpendicular case, as described previously. If a measured value of birefringence is small there will occur a situation wherein the fast axis is not always perfectly parallel or perpendicular to a radial direction of a member, but is inclined relative thereto. A birefringence value in such a situation may be handled so as to assign + to a value when the angle of the fast axis to the radial direction is smaller than 45°, but assign − to a value when the angle is greater than 45°.

Figure 2A:
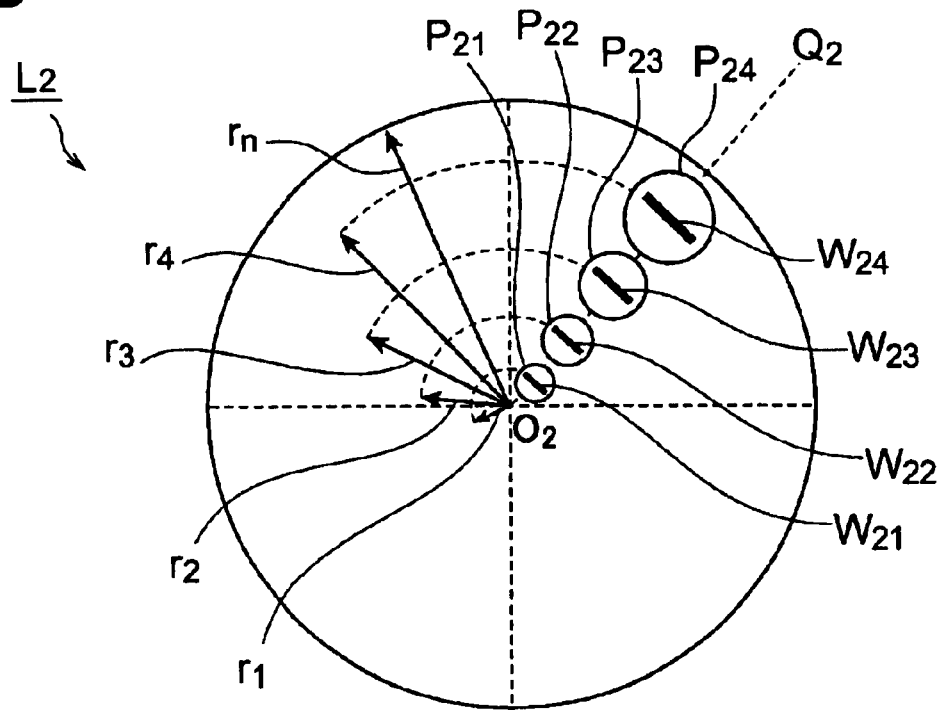
FIG. 2A is another explanatory diagram to show the notion of the signed birefringence values and FIG. 2B is a graph to show the distribution of signed birefringence values in the optical member illustrated in FIG. 2A.
Figure 2B:
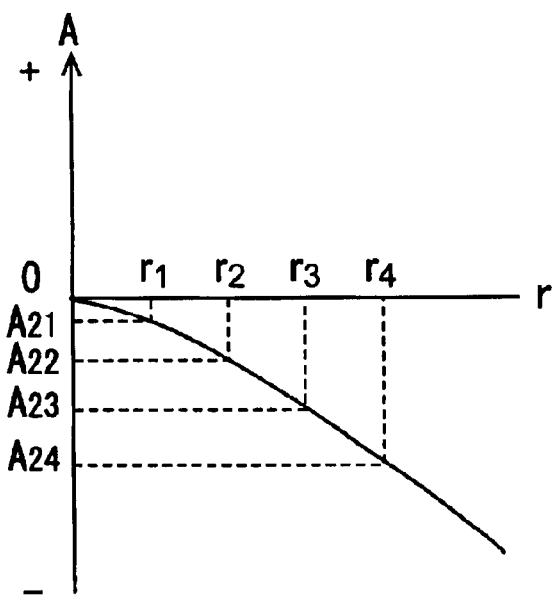
Figure 3A:
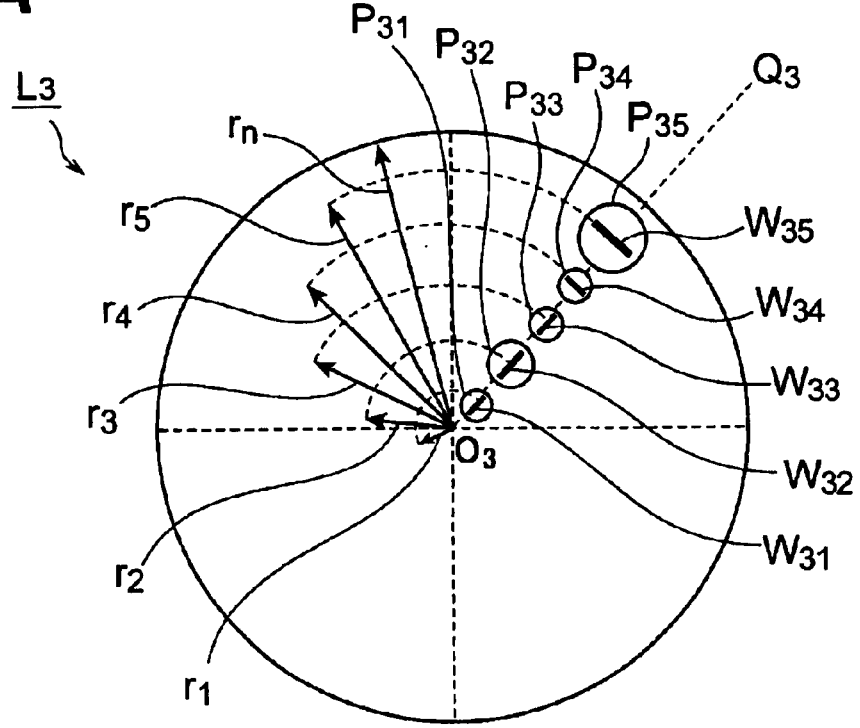
FIG. 3A is another explanatory diagram to show the notion of the signed birefringence values and FIG. 3B is a graph to show the distribution of signed birefringence values in the optical member illustrated in FIG. 3A.
Figure 3B:
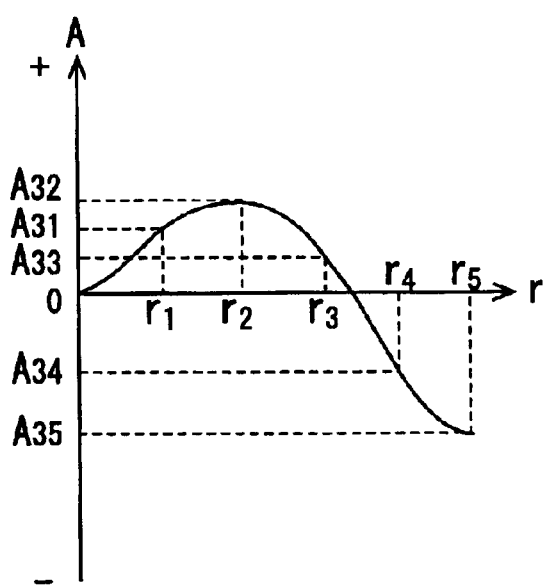

In the conventional production methods a high-temperature thermal treatment is carried out at temperatures (normally, not less than 1600° C.) higher than the devitrification temperature range of silica glass and enough to cause softening and deformation of glass where heterogeneity of equal index to observe striae in synthetic silica glass is conspicuous. However, when the birefringence value and the direction of the fast axis are measured at a plurality of points in the plane normal to the rotational axis of the synthetic silica glass obtained by such a high-temperature thermal treatment, there normally appears the correlation as illustrated in FIG. 2B between distance r from the center and signed birefringence value A. The present invention permits the distribution of signed birefringence values of such synthetic silica glass to be homogenized by carrying out the aforementioned second and third steps. However, to carry out the above high-temperature thermal treatment for the synthetic silica glass obtained through the above second or third step is not preferable, because it makes the distribution of birefringence values inhomogeneous.

The synthetic silica glass obtained by the production method of the present invention is one with a sufficiently homogenized distribution of birefringence values, and sufficiently high imaging performance of optical system and sufficiently high resolution of projection exposure apparatus can be achieved by using optical members of lenses and the like made of such synthetic silica glass, for the optical system of the projection exposure apparatus. On the occasion of fabricating an optical system by assembly of plural optical members, the imaging performance and resolution can be enhanced more by fabricating the optical system while estimating a signed birefringence characteristic value of the entire optical system from the signed birefringence values of the respective members so as to cancel out distributions of birefringence values with each other.

Here the notion of the signed birefringence characteristic value of the entire optical system according to the present invention will be described on the basis of FIG. 7A and FIG. 7B.

Figure 7A:
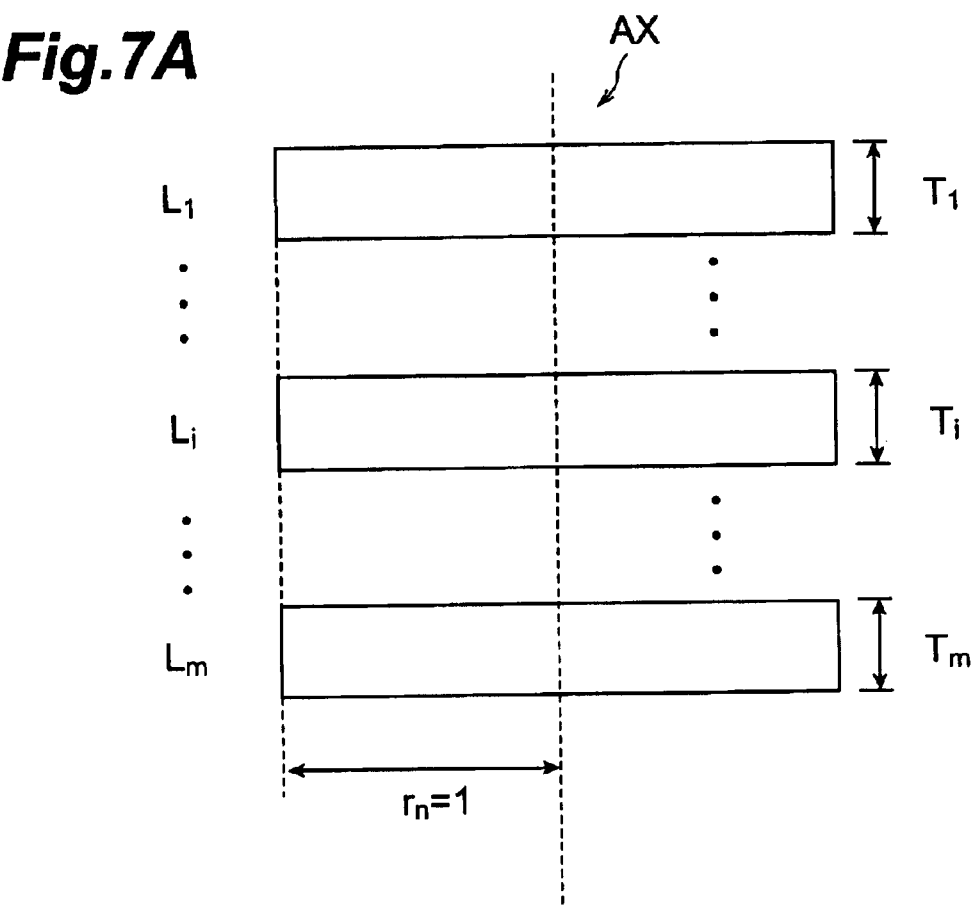
FIG. 7A is a side view to show a plurality of optical members constituting a projection optical system and FIG. 7B a cross-sectional view of the optical members constituting the projection optical system.
Figure 7B:
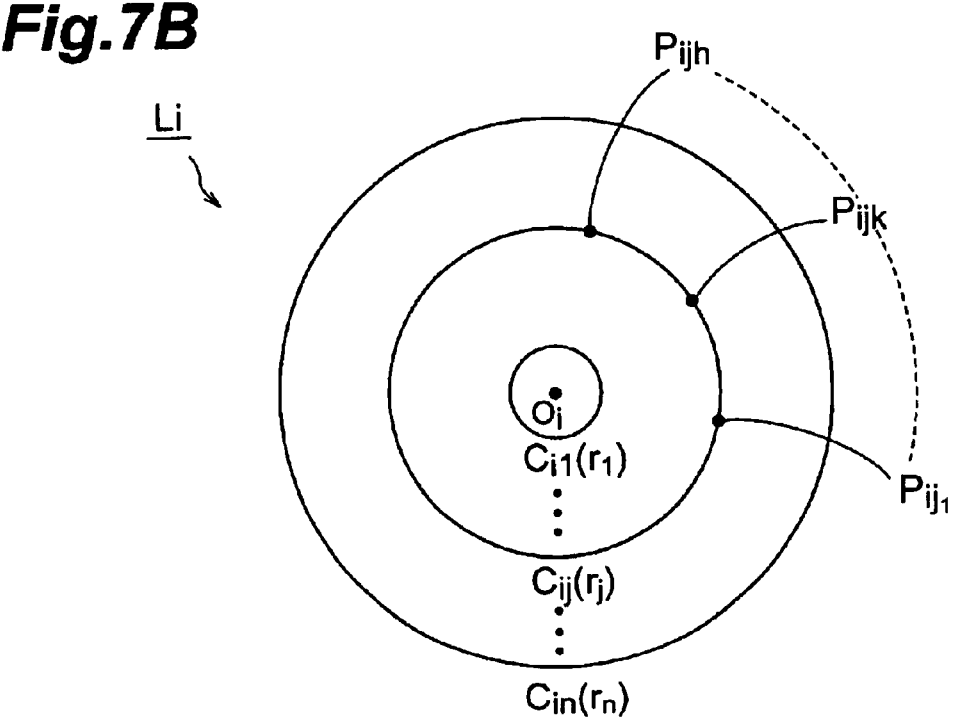

FIG. 7A is a schematic side view of an arrangement in which m optical members constituting a projection optical system are arranged in order from the light source side. FIG. 7B is a schematic sectional view to show the effective section normal to the optical axis of the optical member Li located at the ith position from the light source out of the m optical members illustrated in FIG. 7A.

In the present invention, it is assumed that the distribution of birefringence values in each optical member is uniform in the direction of the thickness of the member parallel to the optical-axis direction but nonuniform in the radial directions on the effective section normal to the optical axis. Here the effective section means a region illuminated with the beam in the plane normal to the optical axis of the optical member. Then the center of the effective section is defined at the intersection with the optical axis and a radius thereof is defined as an effective radius of the effective section of the optical member. On the occasion of measurement of the signed birefringence characteristic value of the entire projection optical system, since the sizes of the effective sections of the optical members differ among the optical members, the sizes of the effective sections of all the optical members are preliminarily normalized so that the maximum effective radius $r_n$ of each optical member is 1, as illustrated in FIG. 7A.

When a plurality of beams are radiated into the plane normal to the optical axis with the center at the intersection with the optical axis of the optical member, the sizes of the effective sections of all the optical members are preliminarily normalized so that the maximum effective radius $r_n$ of each optical member is 1, for the effective sections corresponding to the individual beams.

Further, when the beam having the shape except for the circular section, e.g., the beam of the ring section or the elliptic section is radiated into the plane normal to the optical axis with the center at the intersection with the optical axis of the optical member, the sizes of the effective sections of all the optical members are preliminarily normalized so that the maximum effective radius $r_n$ of each optical member is 1, for the effective sections corresponding to each beam.

For example, when the beam of the ring section is radiated, the sizes of the effective sections of all the optical members are preliminarily normalized so that the maximum outside radius of the ring is 1, and the measurement of signed birefringence values can be performed in similar fashion to the measurement for the beam of the circular section described hereinafter. When the beam of the elliptic section is radiated, the sizes of the effective sections of all the optical members are preliminarily normalized so that the maximum outside radius along the major axis of ellipse is 1, and the measurement of signed birefringence values can be carried out in similar fashion to the measurement for the beam of the circular section described hereinafter.

For measuring the signed birefringence characteristic value of the projection optical system, the first step is to establish for one optical member $L_i$ a hypothetical model of plural concentric circles $C_{ij}$ having the center $O_i$ and respective radii from the center different from each other on the effective section thereof. Then a birefringence value is measured at the kth measuring point $P_{ijk}$ on the jth concentric circle $C_{ij}$ having the radius $r_j$ from the center $O_i$. Further, the sign is assigned to the measured value from the relation between the direction of the fast axis and the radial direction at the measuring point $P_{ijk}$ to obtain the signed birefringence value $A_{ijk}$ at the measuring point $P_{ijk}$.

Here the symbol i represents a number (i=1, 2, . . . , m; $2 \leq m$) of the optical member L constituting the projection optical system. The symbol j represents a number (j=1, 2, . . . , n; $1 \leq n$) of the concentric circle C having the center on the optical axis and the radius from the optical axis different from those of the other circles, assumed on the effective section normal to the optical axis of the optical member L. Further, the symbol k represents a number (k=1, 2, . . . , h; $1 \leq h$) of the measuring point on the circumference of the concentric circle C. In this way the signed birefringence values $A_{ij1}$ to $A_{ijh}$ are measured at predetermined measuring points $P_{ij1}$ to $P_{ijh}$ on the same concentric circle $C_{ij}$.

The next step is to calculate a mean signed birefringence value $B_{ij}$ being an arithmetic mean of the signed birefringence values at the measuring points on the circumference of the concentric circle $C_{ij}$ in the optical member $L_i$, in accordance with Eq. (1) below.

$$B_{ij} = \frac{\sum_{k=1}^{h} A_{ijk}}{h} \quad (1)$$

The next step is to calculate $E_{ij}$ indicating a mean signed birefringence amount, which is the product of the mean signed birefringence value $B_{ij}$ and apparent thickness $T_i$, in accordance with Eq. (2) below.

$$E_{ij} = B_{ij} \times T_i \quad (2)$$

Here $T_i$ indicates the apparent thickness of the optical member $L_i$. This apparent thickness is either one properly selected from an average of thickness in the effective section of the optical member $L_i$ and an effective thickness determined from matching with other members combined above and below the optical member $L_i$ in arrangement in the optical system.

The next step is to calculate a mean change amount $G_j$ of signed birefringence values, which is obtained by dividing the sum of mean signed birefringence amounts $E_{ij}$ in the overall projection optical system by the total path length D, in accordance with Eq. (3) below.

$$G_j = \frac{\sum_{i=1}^{m} E_{ij}}{D} \quad (3)$$

Here the symbol D represents the apparent total path length of the entire projection optical system expressed by Eq. (4) below.

$$D = \sum_{i=1}^{m} T_i \quad (4)$$

The next step is to calculate the signed birefringence characteristic value H of the entire projection optical system, which is obtained by dividing the sum of mean change amounts $G_j$ of signed birefringence values in the entire projection optical system by the number n of concentric circles, in accordance with Eq. (5) below.

$$H = \frac{\sum_{j=1}^{n} G_j}{n} \quad (5)$$

In the present invention, it is preferable that the signed birefringence characteristic value H of the entire optical system obtained according to the above procedures satisfy Eq. (6) below, because the entire projection optical system tends to exhibit excellent imaging performance and the projection exposure apparatus provided with such a projection optical system tends to demonstrate excellent resolution.

$$-0.5 \leq H \leq +0.5 \text{ nm/cm} \quad (6)$$

Figure 8:
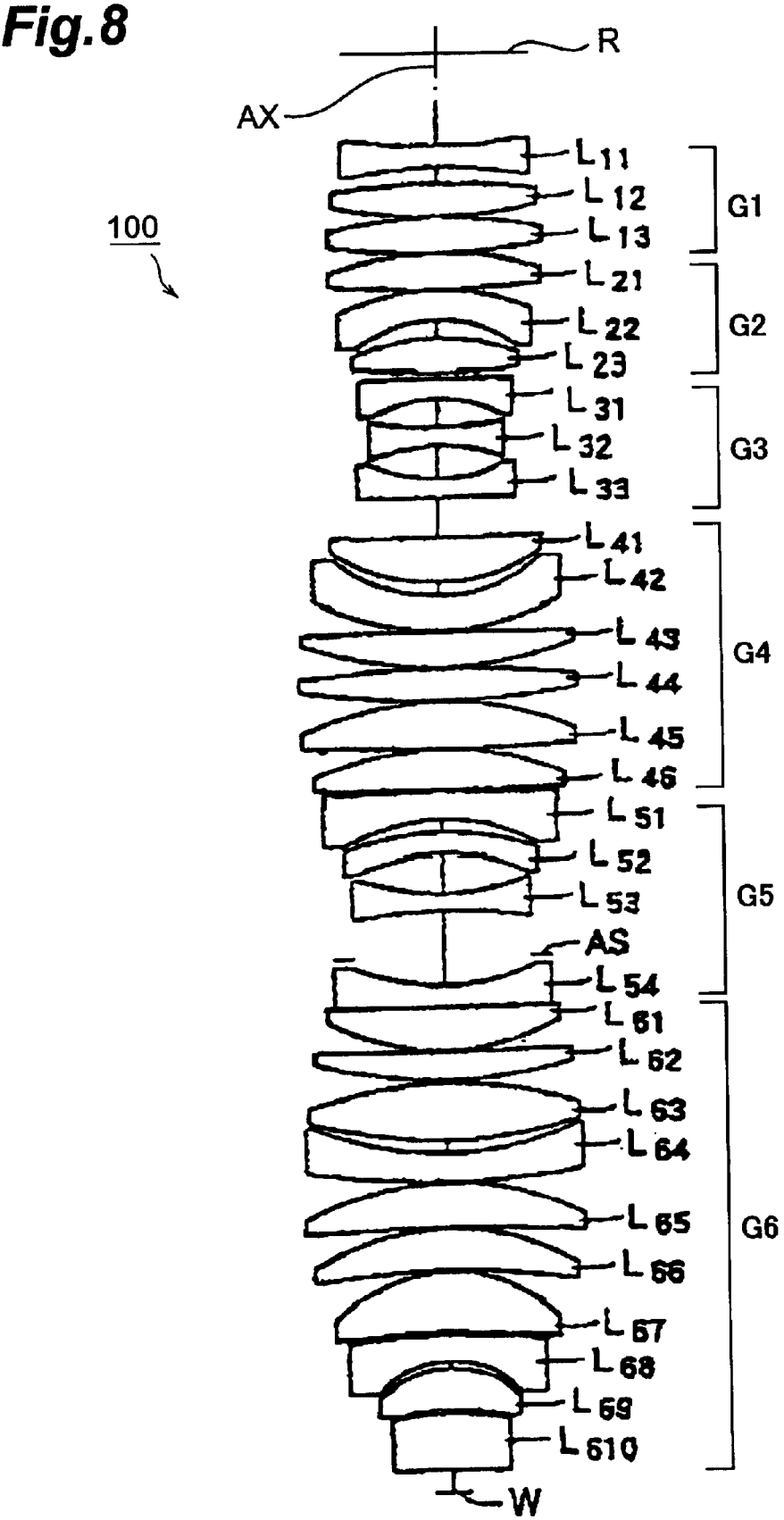
FIG. 8 is a schematic structural diagram to show an example of the projection optical system according to the present invention.

An example of the projection optical system obtained in this manner is presented in FIG. 8.

The projection optical system 100 illustrated in FIG. 8 is composed of a first lens unit G1 of a positive power, a second lens unit G2 of a positive power, a third lens unit G3 of a negative power, a fourth lens unit G4 of a positive power, a fifth lens unit G5 of a negative power, and a sixth lens unit G6 of a positive power, which are arranged in the order named from the side of the reticle R as a first object. The projection optical system 100 is approximately telecentric on the object side (the reticle R side) and on the image side (the wafer W side) and has a reduction ratio. The numerical aperture N.A. of this projection optical system is 0.6 and the projection magnification is ¼.

This projection optical system includes the lenses made of a single crystal of calcium fluoride at the six positions of $L_{45}$, $L_{46}$, $L_{63}$, $L_{65}$, $L_{66}$, and $L_{67}$ for the purpose of correction for chromatic aberration.

The above projection optical system of the present invention is constructed by calculating the signed birefringence characteristic value of the entire projection optical system from the distribution of signed birefringence values in the plane normal to the optical axis Z centered about the intersection with the optical axis Z for each of the optical members $L_{11}$ to $L_{610}$ by the calculation method using Eqs. (1) to (6) above and combining the optical members with each other so as to satisfy the placement condition that the signed birefringence characteristic value of the entire projection optical system is not less than −0.5 nor more than +0.5 nm/cm.

Here the projection optical system according to the present invention is preferably constructed so that the optical members are combined with each other so as to further satisfy the placement condition that a Strehl value of signed birefringence value based on the effective optical path of the entire projection optical system is not less than 0.93.

The inventors found that it was effective to apply the Strehl intensity of signed birefringence value taking account of the effective optical path at and around the center of the effective section of each optical member to the evaluation of the distribution of birefringence in the optical members. Since the Strehl value of birefringence first introduced by the inventors takes account of the effective path of rays passing the effective section, the combination thereof with the evaluation using the signed birefringence characteristic value of the entire optical system permits more precise evaluation of distribution of birefringence in the optical members.

The placement condition of each optical member by this Strehl value of signed birefringence value is expressed based on the following equations.

$$0.93 \leq S \quad (7)$$

$$S = \prod_{i=1}^{m} S_i \quad (8)$$

$$S_i = 1 - \left(\frac{2\pi}{\lambda}\right)^2 \cdot \left(\frac{\sigma^2}{2} + \frac{|\chi|^2}{4}\right) \quad (9)$$

[In Eqs. (7) to (9), $\lambda$ represents the wavelength of the light source, $\chi$ an average of signed birefringence values determined from the distribution in the effective radial direction of signed birefringence values based on the effective optical path obtained for the optical member $L_i$ by ray tracing tests of the entire projection optical system, $\sigma$ a standard deviation of signed birefringence values determined from the distribution in the effective radial direction of signed birefringence values based on the effective path obtained for the optical member $L_i$ by ray tracing tests of the entire projection optical system, $S_i$ a Strehl intensity of signed birefringence value based on the effective optical path for each optical member $L_i$, and S the Strehl intensity of signed birefringence value based on the effective path of the entire projection optical system in the combination of all the optical members $L_i$.]

Further, the projection optical system according to the present invention is preferably constructed so that the signed birefringence values around the center $O_i$ of the optical member $L_i$ are not more than 0.2 nm/cm. Since most of light radiated onto optical members has its optical axis in the central part of the optical members, use of optical members satisfying the above condition enables the influence of birefringence to be largely reduced, when compared with systems using optical members having birefringence in the central part.

Moreover, the projection optical system according to the present invention is preferably constructed so that the distribution in the radial direction of mean signed birefringence values $B_{ij}$ in the optical member $L_i$ has no extremum except at the center $O_i$. Further, if the distribution of signed birefringence values of each optical member has no extremum except at the center, it is easy to estimate the signed birefringence characteristic value of the entire optical system and it becomes feasible to attain desired optical performance by effectively canceling out the effects of birefringence of the individual members.

Yet further, the projection optical system according to the present invention is preferably constructed so that a difference $\Delta B_i$ between a maximum and a minimum of the mean signed birefringence values $B_{ij}$ in the optical member $L_i$ is not more than 2.0 nm/cm. The larger the difference $\Delta B_i$ between maximum and minimum in the distribution in the radial direction of mean signed birefringence values $B_{ij}$, the larger the dispersion of the mean signed birefringence values $B_{ij}$ of the optical members, in turn, the dispersion of signed birefringence values $A_{ijk}$. If light is radiated onto an optical member whose difference $\Delta B_i$ between maximum and minimum of the mean signed birefringence values $B_{ij}$ is greater than 2.0 nm/cm, the difference among the signed birefringence values $A_{ijk}$ will become large depending upon passing positions of light, so as to cause disturbance of the wavefront of light, whereby the imaging performance of the optical system will tend to degrade heavily.

Yet further, the projection optical system according to the present invention is preferably constructed so that a maximum $F_i$ of slope of a distribution curve in the radial direction of the mean signed birefringence values $B_{ij}$ in each optical member $L_i$ is not more than 0.2 nm/cm per 10 mm of radial width. When the projection optical system is constructed using such optical members, it becomes feasible to achieve excellent imaging performance of the projection optical system and achieve uniform resolution across the entire wafer surface in the projection exposure apparatus provided with such a projection optical system. Just as in the above case wherein the difference $\Delta B_i$ between maximum and minimum is large in the distribution in the radial direction of the mean signed birefringence values $B_{ij}$, the larger the maximum $F_i$ of slope of the distribution curve in the radial direction of the mean signed birefringence values $B_{ij}$, the greater the dispersion of the mean signed birefringence values $B_{ij}$ of the optical member, in turn, the dispersion of signed birefringence values $A_{ijk}$. If the light is radiated onto an optical member whose maximum $F_i$ of slope of the distribution curve in the radial direction of the mean signed birefringence values $B_{ij}$ is larger than 0.2 nm/cm per 10 mm of radial width, the difference among the signed birefringence values $A_{ijk}$ will become large depending upon the passing positions of the light, so as to cause disturbance of the wavefront of light, whereby the imaging performance of the optical system will tend to degrade heavily.

Figure 9:
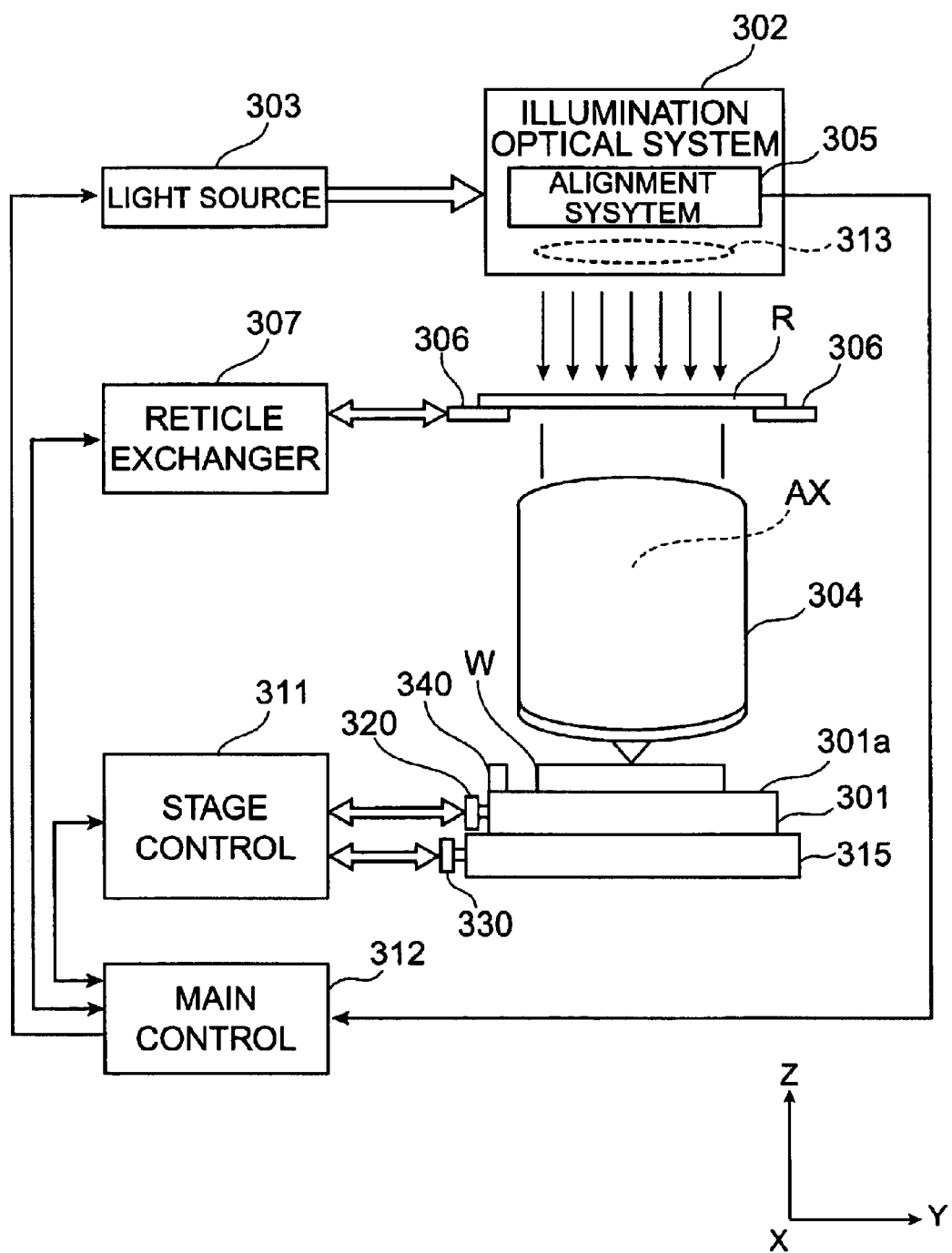
FIG. 9 is a schematic structural diagram to show an example of the projection exposure apparatus according to the present invention.

Next presented in FIG. 9 is an example of the projection exposure apparatus provided with the projection optical system illustrated in FIG. 8.

The projection exposure apparatus illustrated in FIG. 9 is mainly comprised of an exposure light source 303, a reticle R with an original image of pattern formed therein, an illumination optical system 302 for illuminating the reticle R with light emitted from the exposure light source 303, a projection optical system 304 for projecting the pattern image from the reticle R onto a wafer (photosensitive substrate) W, and an alignment system 305 for alignment between the reticle R and the wafer W.

The wafer W is mounted on a leveling stage (not illustrated) and this leveling stage is set on a Z-stage 301 which can be finely moved in the optical-axis direction (Z-direction) of the projection optical system by a driving motor 330. The Z-stage 301 is mounted on an XY stage 315 which can be moved in the two-dimensional directions (XY directions) in the step-and-repeat method by the driving motor 320. The reticle R is mounted on a reticle stage 306 which is two-dimensionally movable in the horizontal plane. The exposure light from the exposure light source 303 uniformly illuminates the pattern formed in the reticle R through the illumination optical system 302 and the pattern image of the reticle R is printed into a shot area of the wafer W by the projection optical system 304. This exposure light can be one of the wavelength selected from 248 nm (KrF excimer laser), 193 nm (ArF excimer laser), 157 nm ($F_2$ laser), and so on.

After completion of the transfer exposure of the pattern of the reticle R into one shot area on the wafer W, the XY stage 315 is stepped so as to align a next shot area of the wafer W with the exposure area of the projection optical system 304. The two-dimensional position of the leveling stage with the wafer W mounted thereon is always monitored, for example, in the resolution of about 0.01 $\mu$m by measuring the distance to a moving mirror 340 fixed to the leveling stage by a laser interferometer (not illustrated), and output from the laser interferometer is supplied to a stage control system 311.

The reticle R is positioned on the reticle stage 306 so that the center of the transfer pattern on the reticle R agrees with the optical axis AX of the projection optical system 304. The positioning of the reticle R is carried out using a plurality of reticle alignment marks (reticle marks) provided near the periphery of the reticle R. There are two types of reticle marks, reticle marks for X-directional positioning and reticle marks for Y-directional positioning. The alignment system 305 branches part of the exposure light from the exposure light source 303 and uses the thus extracted exposure light as illumination light (alignment light). The alignment system 305 consists of alignment units one per position of each reticle alignment mark.

The illumination light passing through the illumination optical system 302 is incident to the reticle marks provided outside the pattern area of the reticle R. The reticle marks are, for example, rectangular transparent ports formed in an opaque portion around the pattern. The alignment light reflected at the reticle mark portion is again incident to the alignment system 305. On the other hand, the alignment light passing through the reticle marks travels through the projection optical system 304 to be incident onto substrate alignment marks (wafer marks) provided around each shot area on the wafer W. The wafer marks may also be provided at predetermined positions of the wafer, for example, only in the peripheral region of the wafer, without being provided around each shot area. The wafer marks also include two types of wafer marks, wafer marks for X-directional positioning and wafer marks for Y-directional positioning, corresponding to the reticle marks. Reflected light from the wafer marks travels through the opposite path to the incident light to pass through the projection optical system 304 and the reticle mark portions and is again incident to the alignment system 305.

In this way the alignment system 305 accepts the reflection of the alignment light from the reticle R and from the wafer W and detects relative positions of the reticle R and the wafer W. Output from this alignment system 305 is supplied to a main control system 312. Then output from the main control system 312 is supplied to a reticle exchange system 307 and to a stage control system 311, thereby adjusting spatial positions of the reticle R and the wafer W. As a result, the overlay accuracy can be maintained high in registration between the pattern formed in each shot area on the wafer W and the pattern image of the reticle R to be transferred.

Figure 10A:
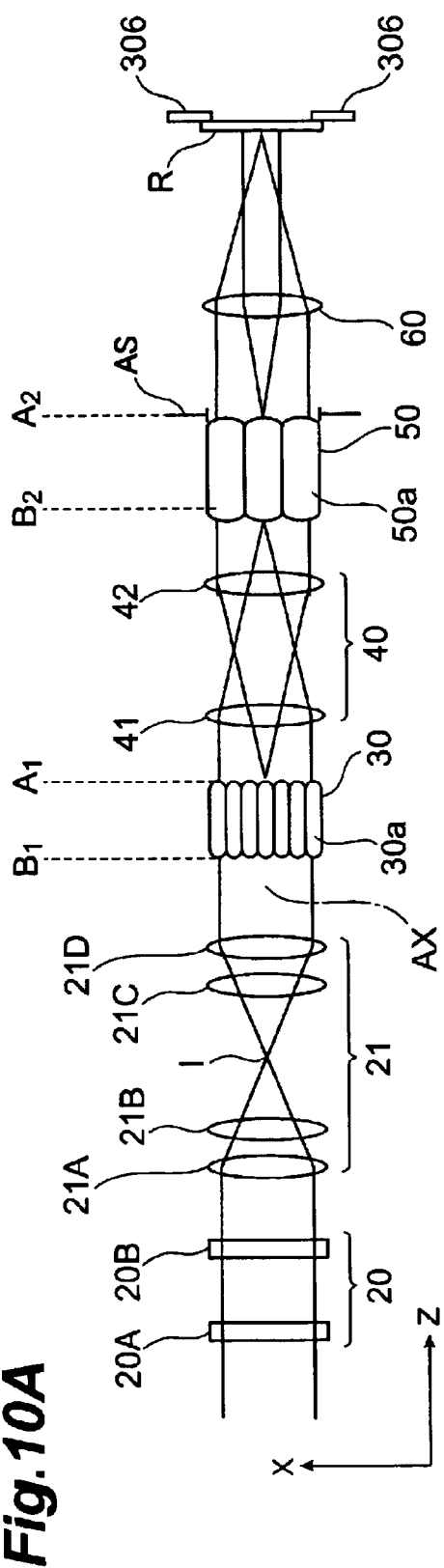
FIG. 10A and FIG. 10B are explanatory diagrams to show an example of the structure of the illumination optical system in the projection exposure apparatus illustrated in FIG. 9.
Figure 10B:
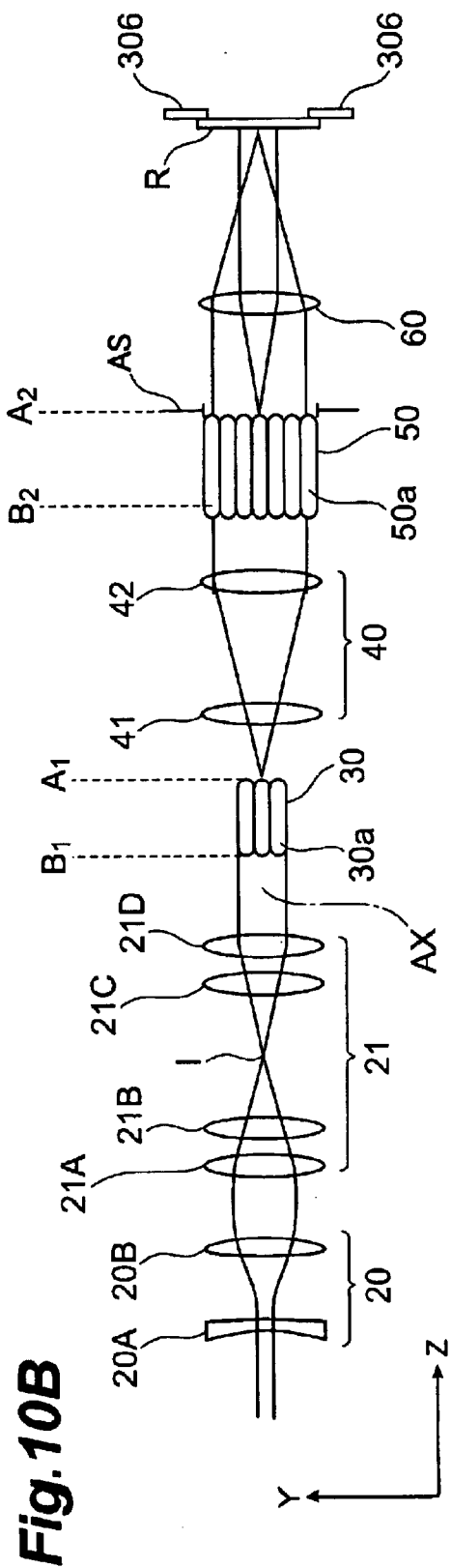

FIG. 10A and FIG. 10B are schematic structural diagrams to show the detailed structure of the illumination optical system 302 of the projection optical apparatus illustrated in FIG. 9.

FIG. 10A is a front elevation of the illumination optical system 302 which is a view from the Y-direction of FIG. 9, and FIG. 10B a front elevation of the illumination optical system as a view from the X-direction of FIG. 9. The alignment system 302 for branching and using part of the exposure light incident to the illumination optical system 302 is omitted from the both figures.

The exposure light source 303 (not illustrated) emits approximately collimated light having the wavelength of 248 nm (KrF excimer laser), 193 nm (ArF excimer laser), 157 nm ($F_2$ laser), or the like, and the cross-sectional shape of the collimated light at this time is rectangular. The collimated light from this exposure light source 303 is incident to a beam shaping optical system 20 as a beam shaping portion for shaping the beam into a predetermined sectional shape. This beam shaping optical system 20 is comprised of two cylindrical lenses (20A, 20B) each having a refractive power in the Y-direction; the source-side cylindrical lens 20A has a negative refractive power to diverge the X-directional beam, and the cylindrical lens 20B on the illuminated surface side has a positive refractive power to condense the diverging beam from the source-side cylindrical lens 20A into parallel light. Accordingly, after the collimated light from the exposure light source 303 passes through the beam shaping optical system 20, the Y-directional beam width is expanded, so that the cross section of the beam is shaped into a rectangular shape having a predetermined size. The beam shaping optical system 20 may also be comprised of a combination of cylindrical lenses of positive refractive power, an anamorphic prism, or the like.

The thus shaped light from the beam shaping optical system 20 is incident to a first relay optical system 21. Here the first relay optical system 21 has a front unit of a positive refractive power consisting of two positive lenses (21A, 21B), and a rear unit of a positive refractive power consisting of two positive lenses (21C, 21D). The front unit (21A, 21B) of the first relay optical system 21 forms a convergence point (light source image) I at the focus position on the reticle R side (rear side) of this front unit and the rear unit (21C, 21D) of the first relay optical system 21 is arranged so that the source-side (front) focus position thereof agrees with the focus position of the front unit (21A, 21B). This first relay optical system 21 has the function to keep the exit surface of the exposure light source 303 conjugate with the entrance surface of an optical integrator 30 as a first multi-source-image forming means described hereinafter. This function of the first relay optical system 21 corrects deviation of the light illuminating the optical integrator 30 due to angular deviation of the light from the exposure light source 303 and thus increases the tolerance to the angular deviation of the light from the exposure light source 303. A beam guiding optical system for guiding the light from the exposure light source 303 to the first multi-source-image forming means is comprised of the beam shaping optical system 20 and the first relay optical system 21.

The light having passed through the first relay optical system 21 is then incident to the optical integrator 30 as the first multi-source forming means for forming a plurality of light source images arranged linearly in an array of three rows. This optical integrator 30 is composed of a plurality of lens elements of the biconvex shape each having a lens cross section of an approximately square shape and arranged in plural rows, and the cross section of the entire optical integrator 30 is rectangular. Each biconvex lens element has equal curvatures (refractive powers) in the Y-direction and in the X-direction.

For this reason, each of parallel beams passing through the individual lens elements constituting the optical integrator 30 is condensed to form a light source image on the exit side of each lens element. Accordingly, a plurality of light source images are formed in the number corresponding to the number of lens elements on the exit position Al of the optical integrator 30, so as to form secondary light sources substantially there.

Beams from the plurality of secondary light sources formed by the optical integrator 30 are condensed by a second relay optical system 40 to be incident to an optical integrator 50 as a second multi-source-image forming means for forming a plurality of light source images.

This optical integrator 50 is composed of a plurality of lens elements of the biconvex shape having a rectangular lens cross section and arranged in plural rows, and each lens element has the cross-sectional shape similar to that of the optical integrator 30. The cross section of the entire optical integrator 50 is square. Each lens element has equal curvatures (refractive powers) in the direction along the plane of FIG. 10A and in the direction along the plane of FIG. 10B.

For this reason, each of the beams from the optical integrator 30, having passed through the individual lens elements constituting the optical integrator 50, is condensed to form a light source image on the exit side of each lens element. Accordingly, a plurality of light source images arranged in the square shape are formed at the exit position A2 of the optical integrator 50, so as to form tertiary light sources substantially there.

The second relay optical system 40 keeps the entrance plane position B1 of the optical integrator 30 conjugate with the entrance plane position B2 of the optical integrator 50 and also keeps the exit plane position A1 of the optical integrator 30 conjugate with the exit plane position A2 of the optical integrator 50. Further, although the optical integrator 30 and the optical integrator 50 were described in the shape of fly's eye lenses in the above description, there are no specific restrictions on the shape of the optical integrators used in the illumination system of the projection exposure apparatus of the present invention. For example, it is possible to use microfly's eyes composed of a plurality of very fine lens elements, rodlike internal reflection type optical elements (kaleidoscope rods), diffraction optical elements (DOE), and so on.

An aperture stop AS having an aperture of a predetermined shape is disposed at or near the position A2 of the tertiary light sources formed and this aperture stop AS defines the light from the tertiary light sources into a circular shape. The light thus shaped is condensed by a condenser optical system 60 as a condensing optical system to uniformly illuminate the area on the reticle R as an object to be illuminated, in a slit shape.

The projection optical system 304 illustrated in FIG. 9 is constructed by combining the optical elements so as to satisfy the placement condition that the signed birefringence characteristic value of the entire projection optical system is not less than −0.5 nor more than +0.5 nm/cm. The optical members are also combined with each other so as to further satisfy the placement condition that the Strehl value of signed birefringence value based on the effective path of the entire projection optical system is not less than 0.93. Further, the optical members used are those satisfying the following conditions; the signed birefringence values around the center of the effective section are −0.2 to +0.2 nm/cm; the radial distribution of the mean signed birefringence values has no extremum except at the center; the difference $\Delta B_i$ between maximum and minimum of the mean signed birefringence values is not more than 2.0 nm/cm; the maximum $F_i$ of slope of the distribution curve in the radial direction of the mean signed birefringence values $B_{ij}$ is not more than 0.2 nm/cm per 10 mm of radial width.

The present invention will be described hereinafter in more detail on the basis of examples and comparative examples, but it is noted that the present invention is by no means intended to be limited to the following examples.

EXAMPLE 1

(Production of Synthetic Silica Glass Ingot)

First, an ingot of synthetic silica glass was produced according to the following procedures, using the synthesis furnace illustrated in FIG. 4.

Specifically, a mixture gas of silicon tetrachloride ($SiCl_4$, flow rate: 40 g/min) and oxygen ($O_2$, flow rate: 1.8 slm) was ejected from the central part of the burner having the multi-tubular structure to bring about hydrolysis in oxyhydrogen flame (oxygen/hydrogen ratio: 0.4) to yield fine particles of silica glass, and they were deposited and vitrified on a target (rotation speed: 7.5 rpm, oscillation speed: 100 mm/min) to obtain an ingot of synthetic silica glass (diameter: 420 mm).

Blocks were cut out from the upper part and lower part of the synthetic silica glass ingot thus obtained, and they were processed by cutting and rounding to obtain blocks A and B having the diameter of 300 mm and the thickness of 80 mm.

(Thermal Treatment 1)

Figure 11A:
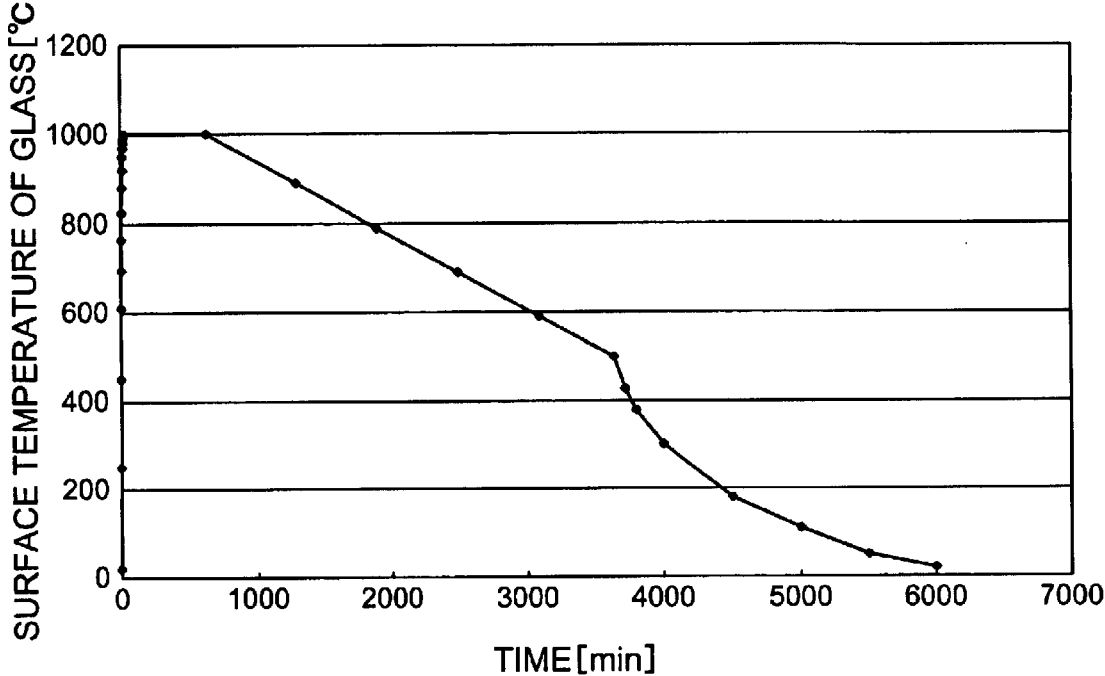
FIG. 11A and FIG. 11B are graphs to show a correlation between surface temperature of synthetic silica glass and time in thermal treatment 1 and in thermal treatment 2, respectively, in Example 1.

The blocks A and B were put into the respective sample chambers provided on the stage of the thermal treatment apparatus illustrated in FIG. 5, and they were heated to 1000° C. with being rotated, and retained thereat for ten hours. After that, they were cooled at the temperature decrease rate of 10° C./h down to 500° C. and naturally cooled after the arrival at 500° C. The correlation between surface temperature of the blocks and time in this step is presented in FIG. 11A.

Figure 12A:
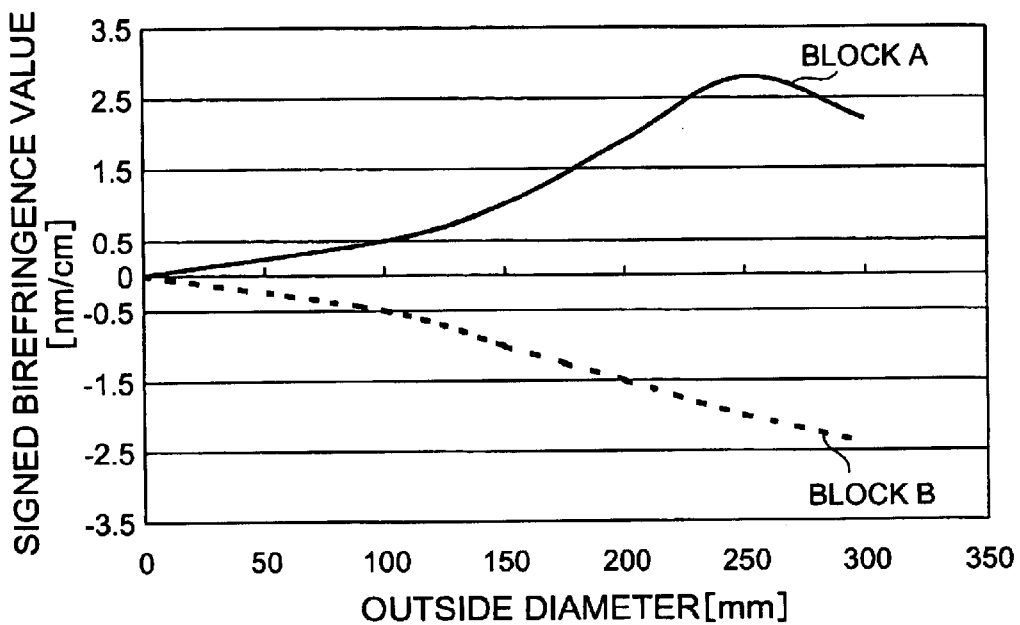
FIG. 12A and FIG. 12B are graphs to show distributions of signed birefringence values of blocks A, B after thermal treatment 1 and after thermal treatment 2, respectively, in Example 1.

With the blocks A and B after the above thermal treatment, birefringence values and directions of the fast axis were measured at a plurality of points by the phase modulation method (the same also applies similarly to the examples and comparative examples below). Distributions of signed birefringence values obtained are presented in FIG. 12A. FIG. 12A shows the distributions of signed birefringence values in the plane normal to the rotational axis of the blocks and the "outside diameter" in the figure means the outside diameter of each circle centered around the intersection between the rotational axis and the plane. For example, a signed birefringence value at the outside diameter of 200 mm means a signed birefringence value at the distance 100 mm from the center (the same also applies similarly to the following).

(Thermal Treatment 2)

Figure 11B:
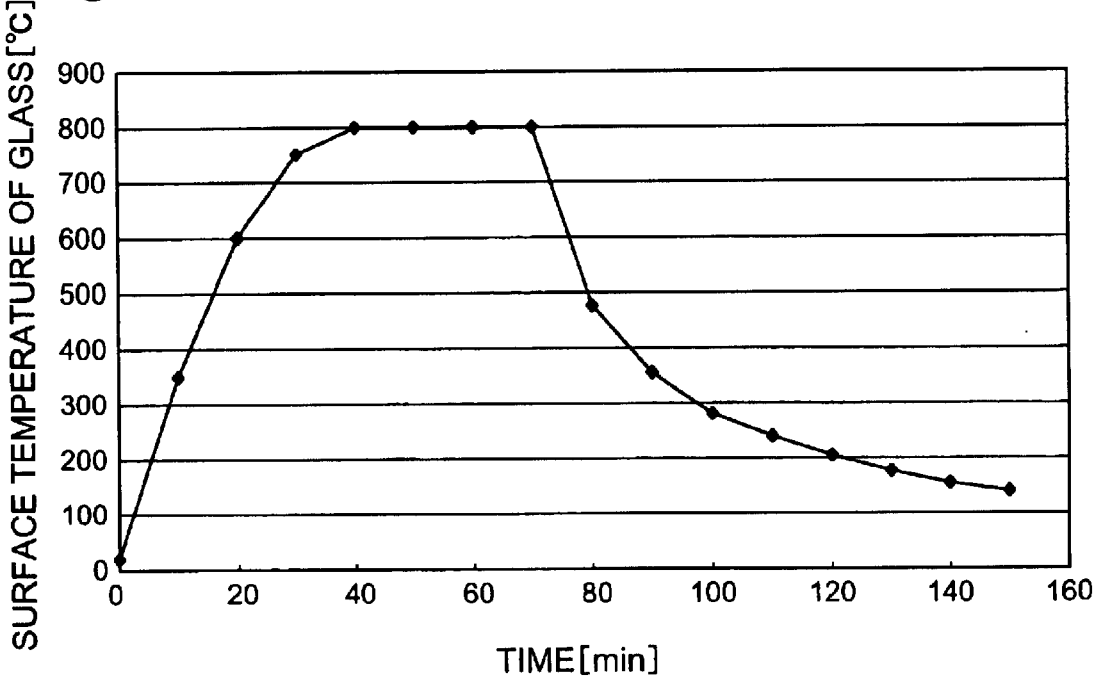

Further, using the thermal treatment apparatus illustrated in FIG. 5, the blocks A and B obtained by the above thermal treatment 1 were heated to 800° C. and retained thereat for 30 minutes, and thereafter the stage was moved down to expose the blocks to the atmosphere, thereby cooling the blocks at the temperature decrease rate of 620° C./h. The correlation between surface temperature of the blocks and time in this step is presented in FIG. 11B.

Figure 12B:
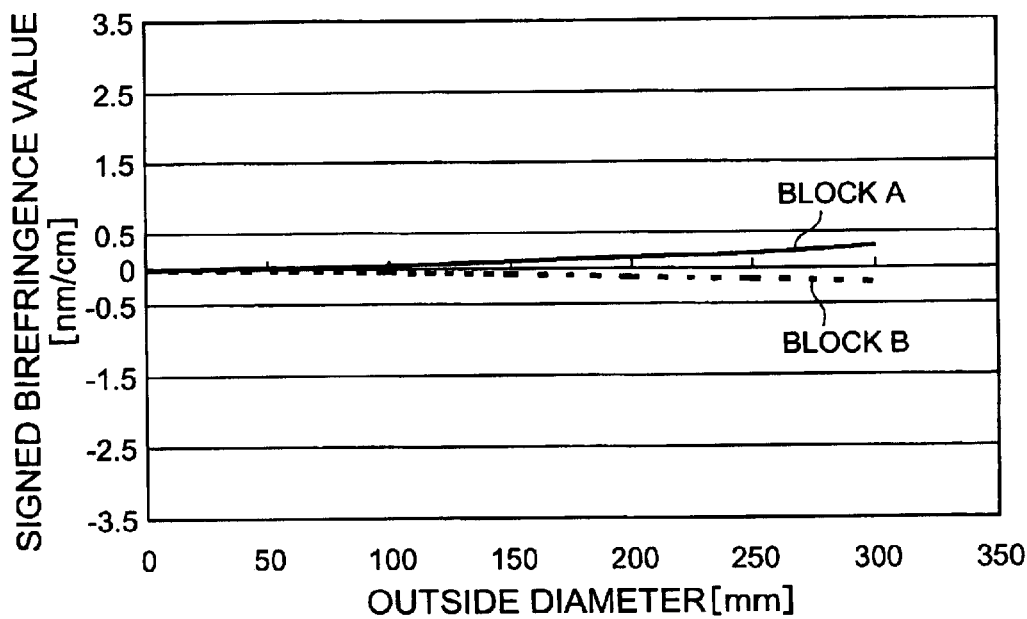

Distributions of signed birefringence values obtained for the blocks A and B after the above thermal treatment are presented in FIG. 12B. The block A demonstrated the distribution of signed birefringence values monotonically increasing in the radial direction from the center and the maximum thereof was +0.3 nm/cm. The block B demonstrated the distribution of signed birefringence values monotonically decreasing in the radial direction from the center and the minimum thereof was −0.2 nm/cm.

(Fabrication of Projection Exposure Apparatus)

The blocks A and B obtained in this way were processed into lens shape and the projection optical system illustrated in FIG. 8 was fabricated based on the signed birefringence characteristic values obtained using aforementioned Eqs. (1) to (6).

Then the projection exposure apparatus illustrated in FIG. 9 was fabricated using the projection optical system thus obtained and the resolution thereof was evaluated. The processing line width of 0.19 μm was attained.

EXAMPLE 2

(Thermal Treatment 1)

First, blocks were cut out from the upper part and lower part of a synthetic silica glass ingot prepared in the same way as in Example 1, and they were processed by cutting and rounding to obtain blocks C and D having the diameter of 300 mm and the thickness of 80 mm.

Figure 14A:
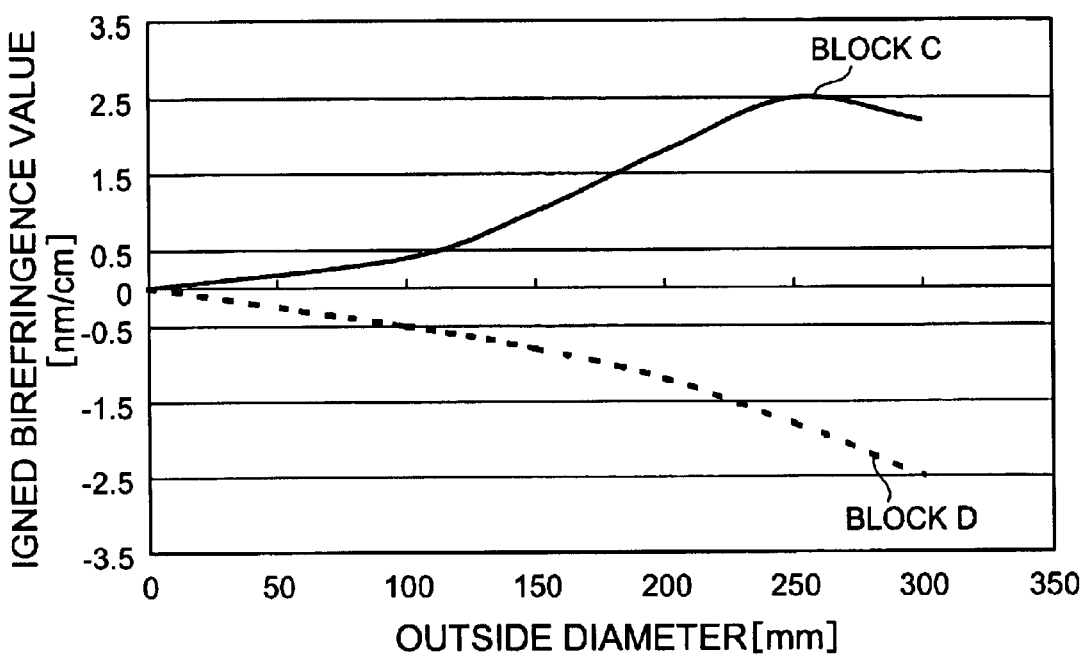
FIG. 14A and FIG. 14B are graphs to show distributions of signed birefringence values of blocks C, D after thermal treatment 1 and after thermal treatment 2, respectively, in Example 2.

Then the blocks C and D were subjected to a thermal treatment similar to the thermal treatment 1 in Example 1. Distributions of signed birefringence values of the blocks C and D thus obtained are presented in FIG. 14A.

(Thermal Treatment 2)

Figure 13:
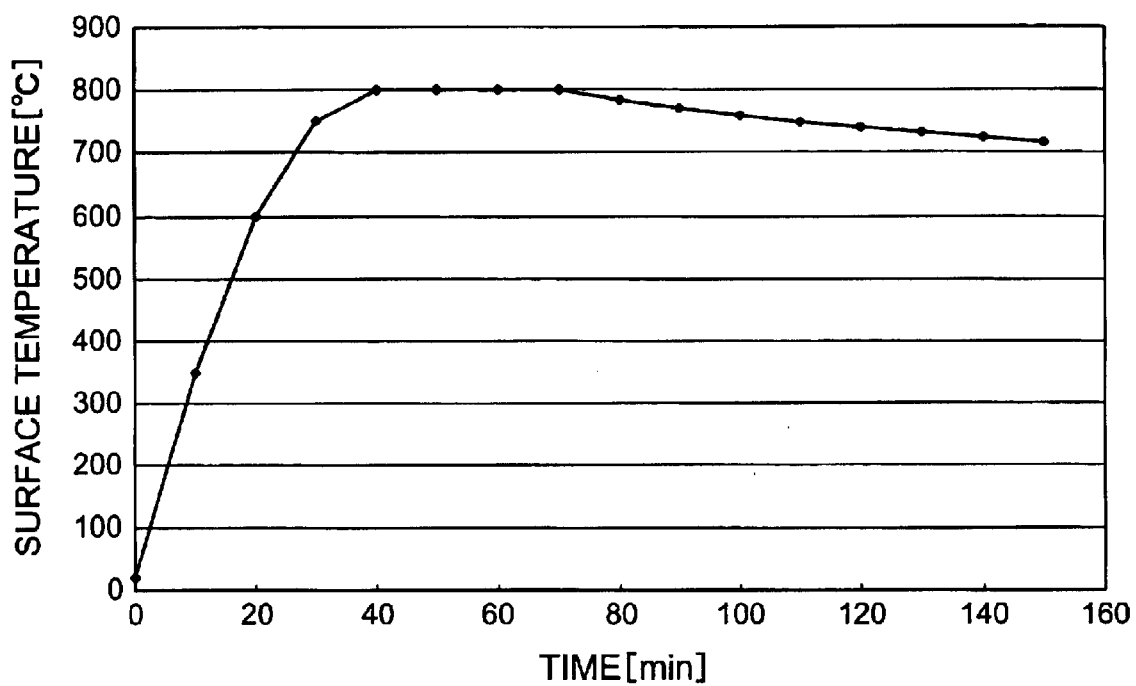
FIG. 13 is a graph to show a correlation between surface temperature of synthetic silica glass and time in thermal treatment 2 in Example 2.
Figure 14B:
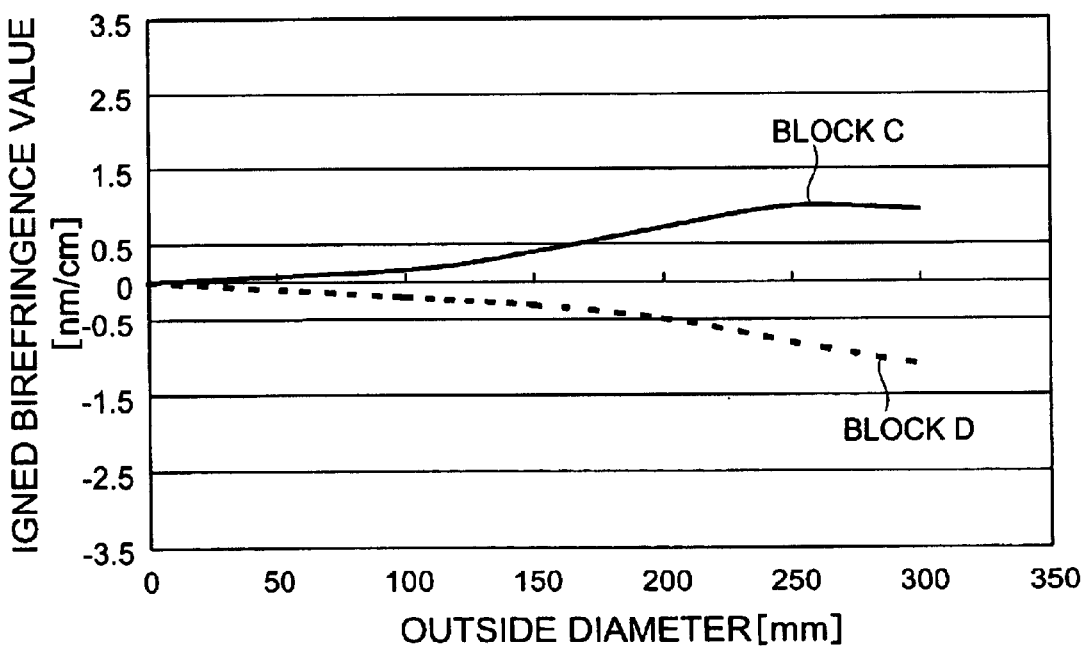

The blocks C and D obtained in this way were heated to 800° C. by use of the thermal treatment apparatus illustrated in FIG. 5 and retained thereat for 30 minutes. After that, they were cooled at the temperature decrease rate of 70° C./h in the furnace. The relation between surface temperature of the blocks and time in this step is presented in FIG. 13. Distributions of signed birefringence values of the blocks C and D obtained in this way are presented in FIG. 14B. The block C demonstrated the distribution of signed birefringence values monotonically increasing in the radial direction from the center to a maximum and then monotonically decreasing after the maximum, and the maximum thereof was +1.0 nm/cm. The block D demonstrated the distribution of signed birefringence values monotonically decreasing in the radial direction from the center and the minimum thereof was −1.0 nm/cm.

The projection exposure apparatus was fabricated using the blocks C and D thus obtained and the resolution thereof was evaluated in the same manner as in Example 1. The processing line width of 0.28 μm was attained.

EXAMPLE 3

(Thermal Treatment 1)

First, blocks were cut out from the upper part and lower part of a synthetic silica glass ingot prepared in the same way as in Example 1, and they were processed by cutting and rounding to obtain blocks E and F having the diameter of 300 mm and the thickness of 80 mm.

Figure 16A:
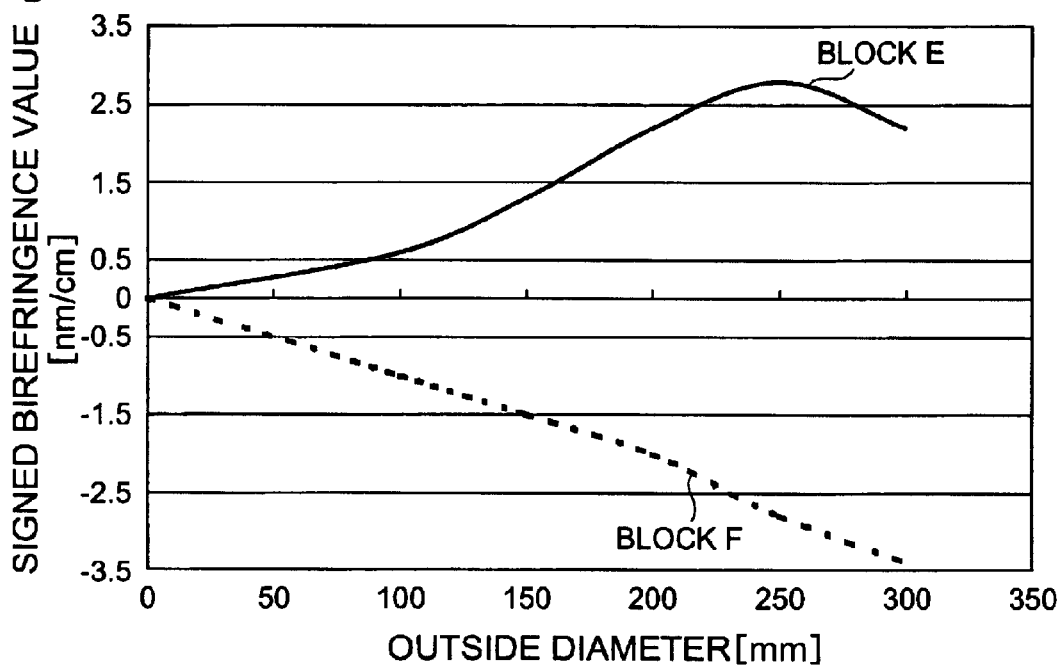
FIG. 16A and FIG. 16B are graphs to show distributions of signed birefringence values of blocks E, F after thermal treatment 1 and after thermal treatment 2, respectively, in Example 3.

Then the blocks E and F were subjected to a thermal treatment similar to the thermal treatment 1 in Example 1. Distributions of signed birefringence values of the blocks E and F thus obtained are presented in FIG. 16A.

(Thermal Treatment 2)

Figure 15:
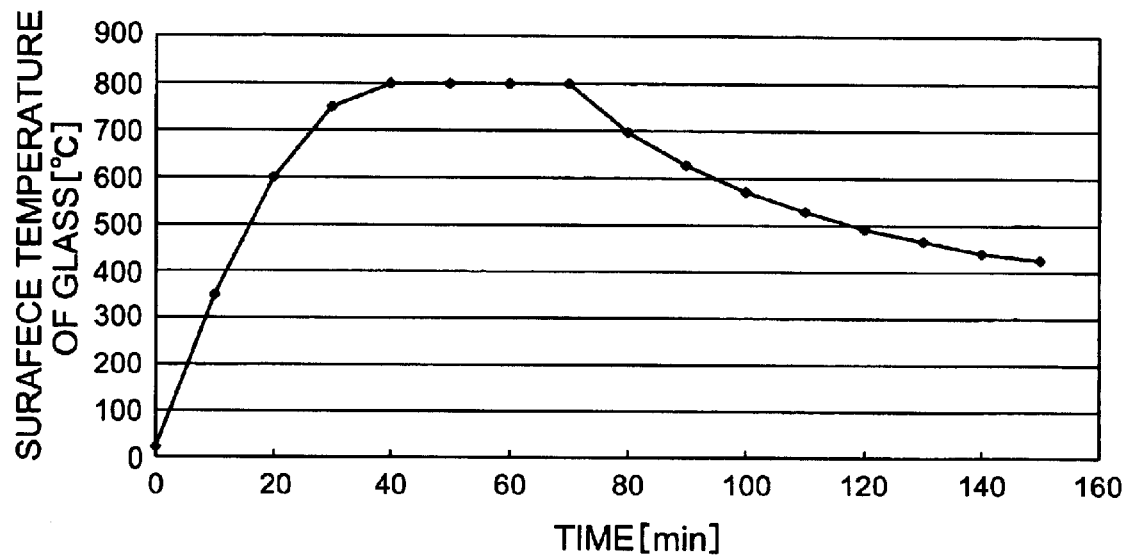
FIG. 15 is a graph to show a correlation between surface temperature of synthetic silica glass and time in thermal treatment 2 in Example 3.
Figure 16B:
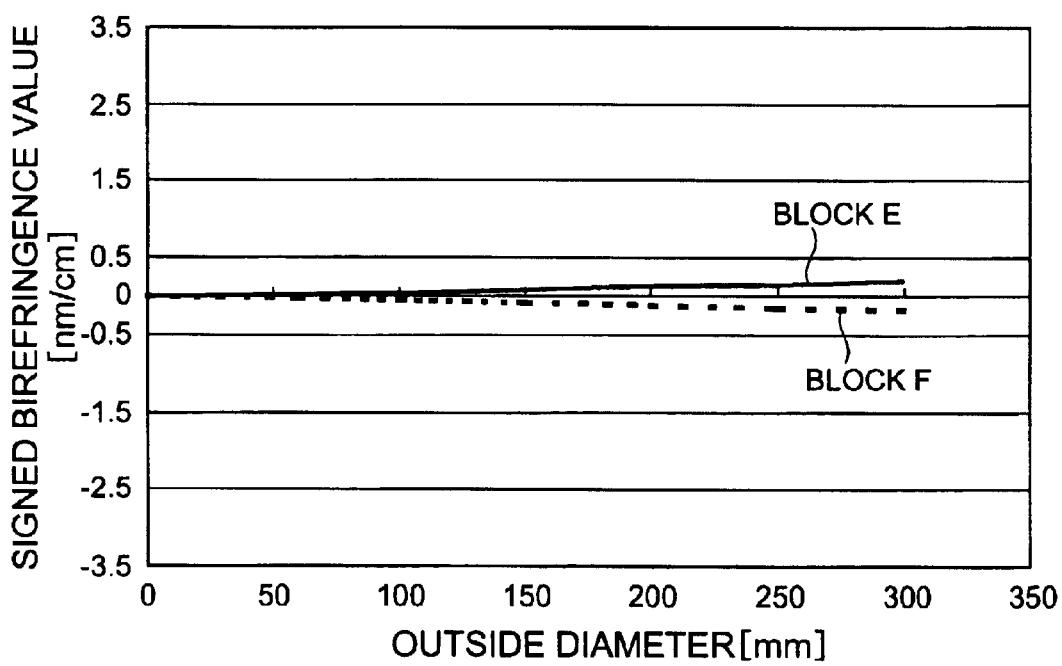

The blocks E and F obtained in this way were heated to 800° C. by use of the thermal treatment apparatus illustrated in FIG. 5 and retained thereat for 30 minutes. After that, the blocks were taken out of the furnace and cooled at the temperature decrease rate of 335° C./h while fine particles mainly containing alumina and silica were charged in the sample chambers. The relation between surface temperature of the blocks and time in this step is presented in FIG. 15. Distributions of signed birefringence values of the blocks E and F obtained in this way are presented in FIG. 16B. The block E demonstrated the distribution of signed birefringence values monotonically increasing in the radial direction from the center and the maximum thereof was +0.2 nm/cm. The block F demonstrated the distribution of signed birefringence values monotonically decreasing in the radial direction from the center and the minimum thereof was −0.18 nm/cm.

The projection exposure apparatus was fabricated using the blocks E and F thus obtained and the resolution thereof was evaluated in the same manner as in Example 1. The processing line width of 0.12 µm was attained.

COMPARATIVE EXAMPLE 1

(Thermal Treatment 1)

Blocks were cut out from the upper part and lower part of a synthetic silica glass ingot produced in the same manner as in Example 1 and they were processed by cutting and rounding to obtain blocks G and H having the diameter of 300 mm and the thickness of 80 mm.

Figure 17A:
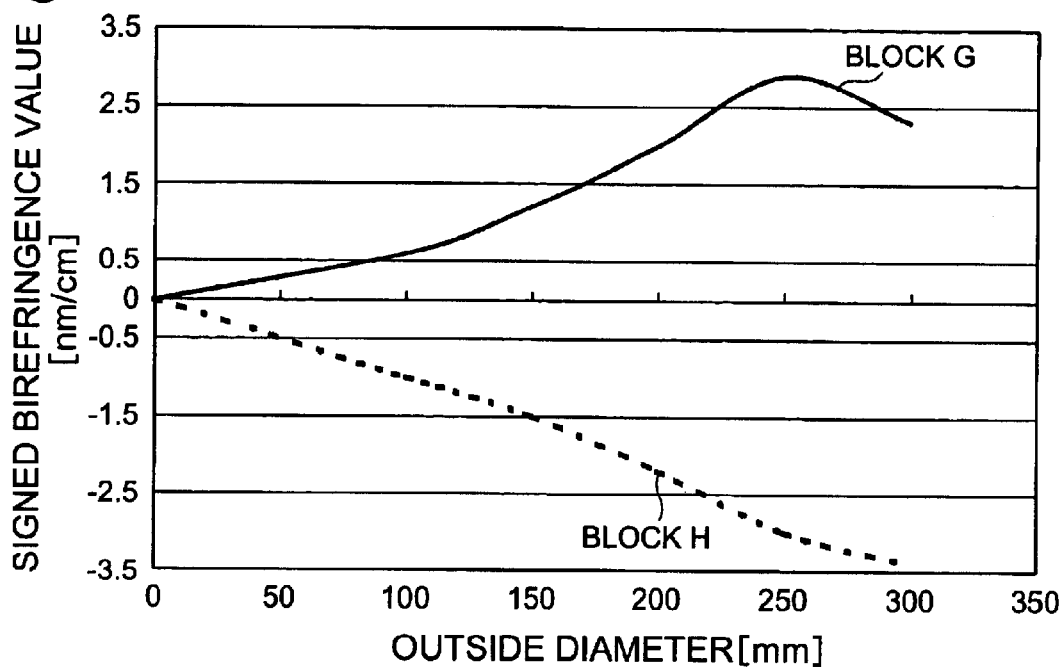
FIG. 17A and FIG. 17B are graphs to show distributions of signed birefringence values of blocks G, H before thermal treatment 1 and after thermal treatment 2, respectively, in Comparative Example 1.
Figure 17B:
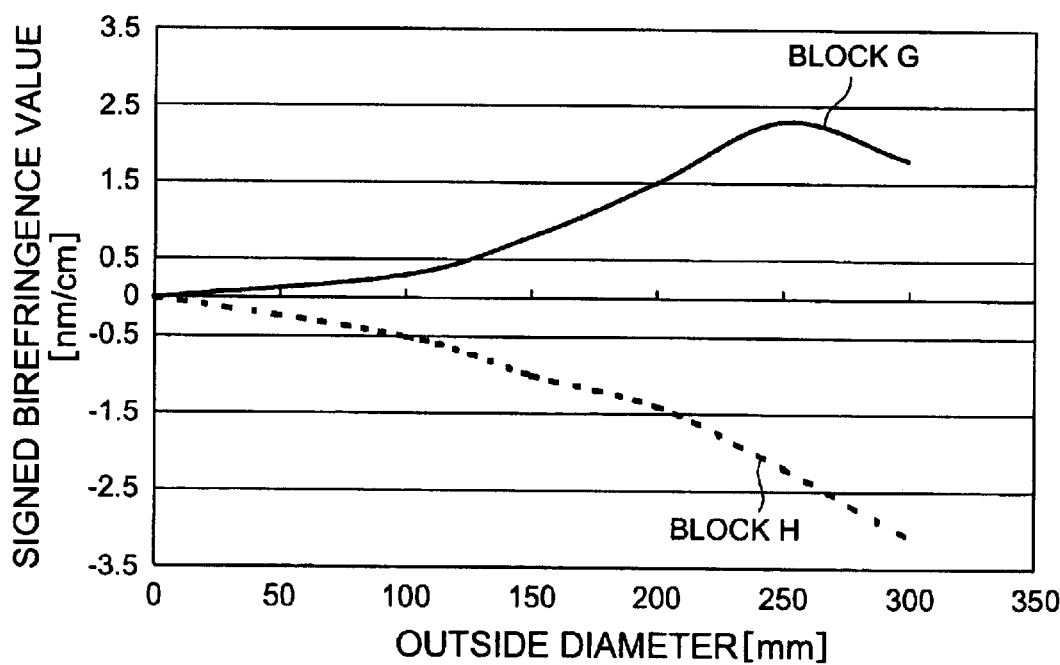

Then the blocks G and H were subjected to a thermal treatment under the same conditions as the thermal treatment 1 described above. Distributions of signed birefringence values before the thermal treatment of the blocks G and H are presented in FIG. 17A, and distributions of signed birefringence values after the thermal treatment in FIG. 17B, respectively. The block G demonstrated the distribution of signed birefringence values monotonically increasing in the radial direction from the center to a maximum and then monotonically decreasing after the maximum, and the maximum thereof was +2.3 nm/cm. The block H demonstrated the distribution of signed birefringence values monotonically decreasing in the radial direction from the center and the minimum thereof was −3.1 nm/cm.

The projection exposure apparatus was fabricated in the same manner as in Example 1, using the blocks G and H obtained in this way, and it was found that the wavefront aberration of the entire projection optical system was far over the measurement range, so as to fail to evaluate the resolution (or measure the processing line width).

COMPARATIVE EXAMPLE 2

(Thermal Treatment 1)

First, blocks were cut out from the upper part and lower part of a synthetic silica glass ingot produced in the same way as in Example 1, and they were processed by cutting and rounding to obtain blocks I and J having the diameter of 300 mm and the thickness of 80 mm.

Figure 19A:
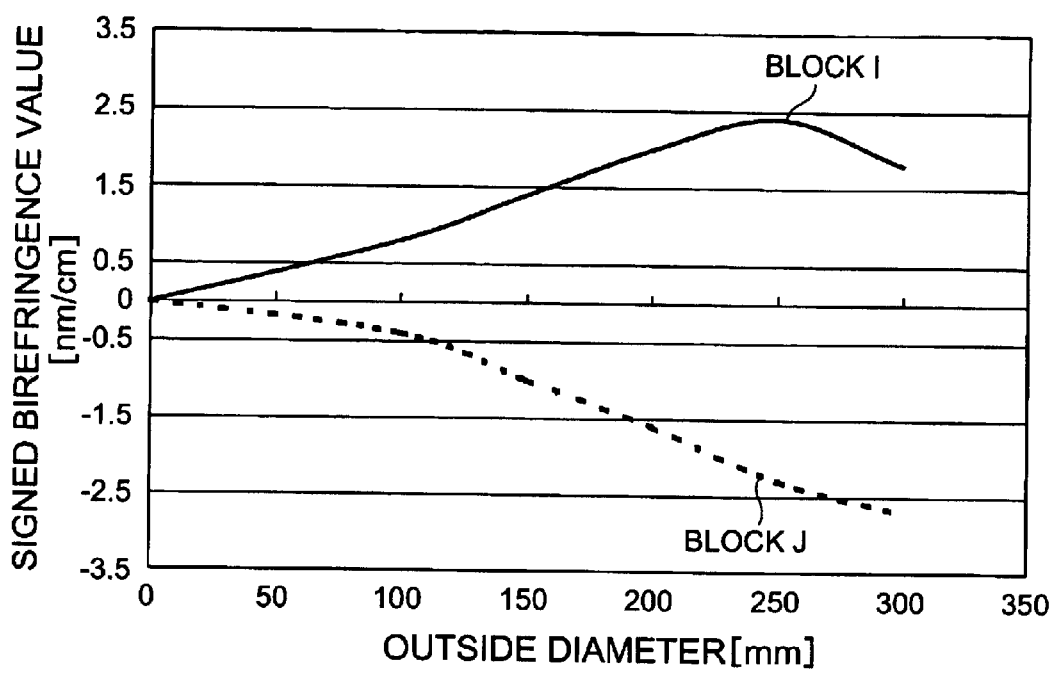
FIG. 19 are graphs to show distributions of signed birefringence values of blocks I, J after thermal treatment 1 and after thermal treatment 2, respectively, in Comparative Example 2.

Then the blocks I and J were subjected to a thermal treatment similar to the thermal treatment 1 in Example 1. Distributions of signed birefringence values of the blocks I and J thus obtained are presented in FIG. 19A.

(Thermal Treatment 2)

Figure 18:
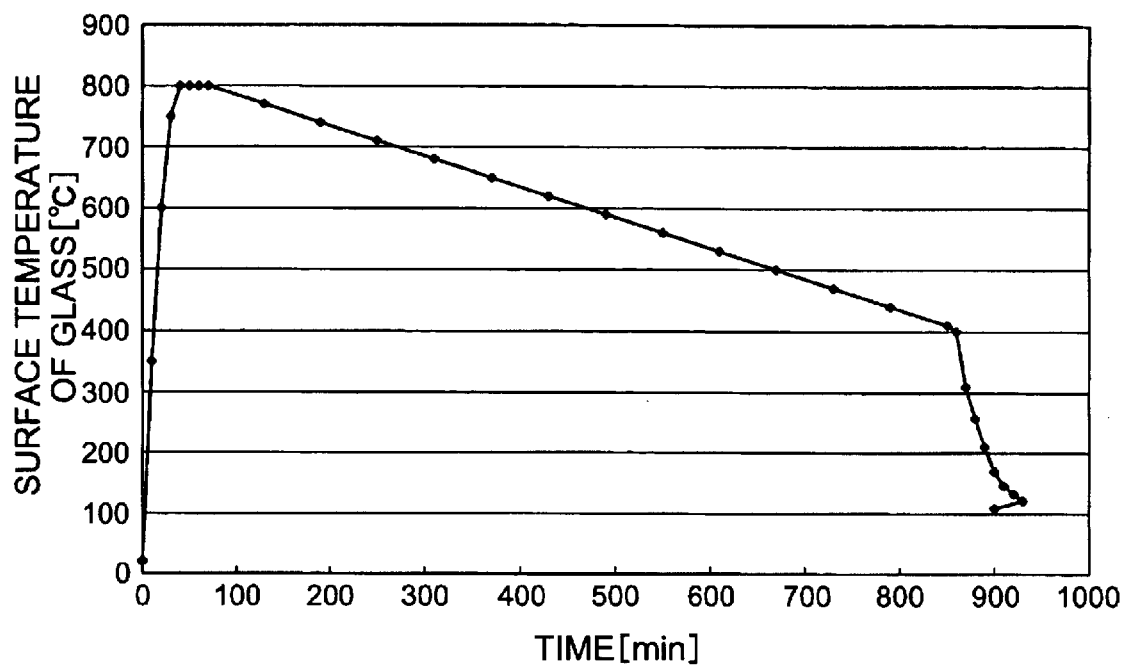
FIG. 18 is a graph to show a correlation between surface temperature of synthetic silica glass and time in thermal treatment 2 in Comparative Example 2.
Figure 19B:
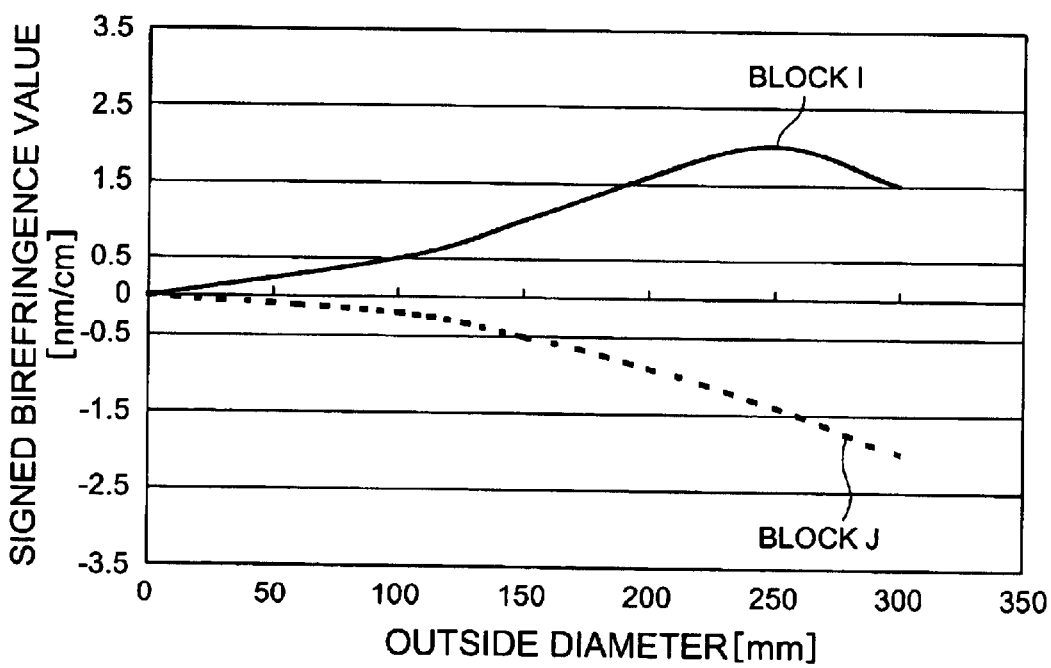

The blocks I and J obtained in this way were heated to 800° C. by use of the thermal treatment apparatus illustrated in FIG. 5 and retained thereat for 30 minutes. After that, they were cooled at the temperature decrease rate of 30° C./h in the furnace. The relation between surface temperature of the blocks and time in this step is presented in FIG. 18. Distributions of signed birefringence values of the blocks I and J obtained in this way are presented in FIG. 19B. The block I demonstrated the distribution of signed birefringence values monotonically increasing in the radial direction from the center to a maximum and then monotonically decreasing after the maximum, and the maximum was +2.0 nm/cm. The block J demonstrated the distribution of signed birefringence values monotonically decreasing in the radial direction from the center, and the minimum was −2.0 nm/cm.

The projection exposure apparatus was fabricated, using the blocks I and J obtained in this way, and the resolution thereof was evaluated in the same manner as in Example 1. The processing line width was 0.42 µm, thus failing to achieve sufficient resolution.

COMPARATIVE EXAMPLE 3

(Thermal Treatment 1)

First, blocks were cut out from the upper part and lower part of a synthetic silica glass ingot produced in the same way as in Example 1, and they were processed by cutting and rounding to obtain blocks K and L having the diameter of 300 mm and the thickness of 80 mm.

Figure 21A:
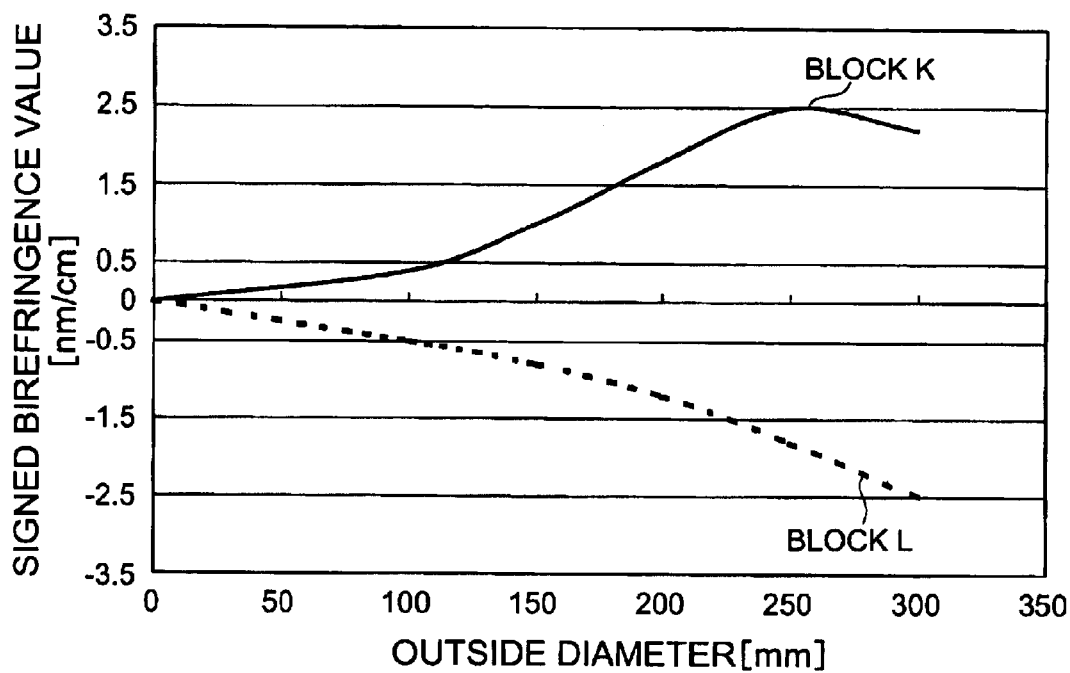
FIG. 21A and FIG. 21B are graphs to show distributions of signed birefringence values of blocks K, L after thermal treatment 1 and after thermal treatment 2, respectively, in Comparative Example 3.

Then the blocks x and L were subjected to a thermal treatment similar to the thermal treatment 1 in Example 1. Distributions of signed birefringence values of the blocks K and L thus obtained are presented in FIG. 21A.

(Thermal Treatment 2)

Figure 20:
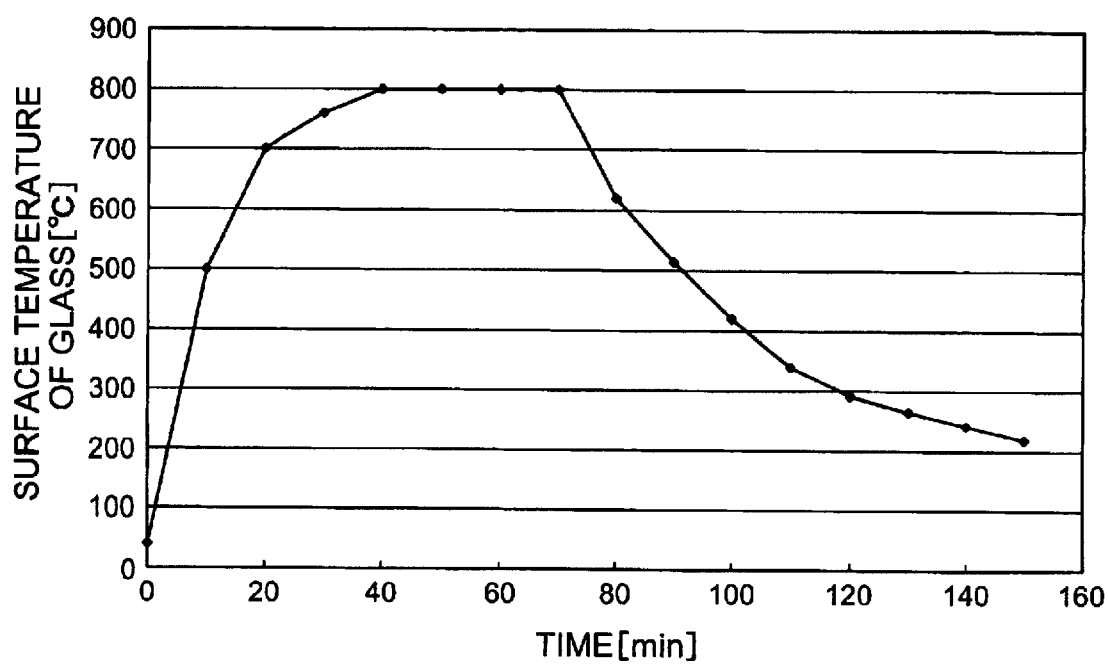
FIG. 20 is a graph to show a correlation between surface temperature of synthetic silica glass and time in thermal treatment 2 in Comparative Example 3.
Figure 21B:
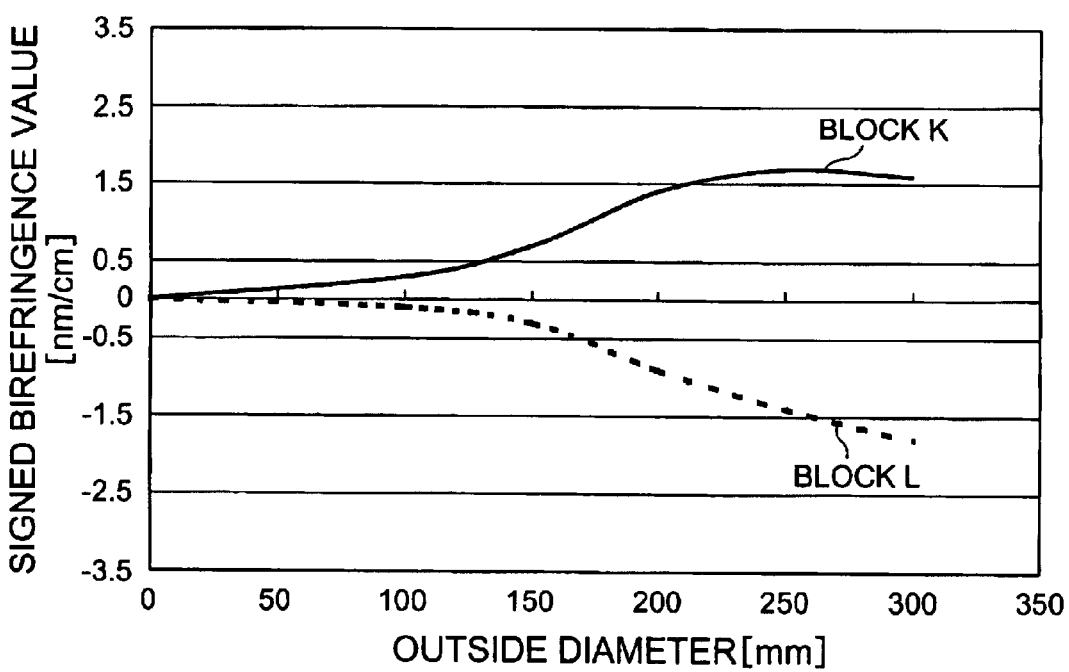
Figure 22A:
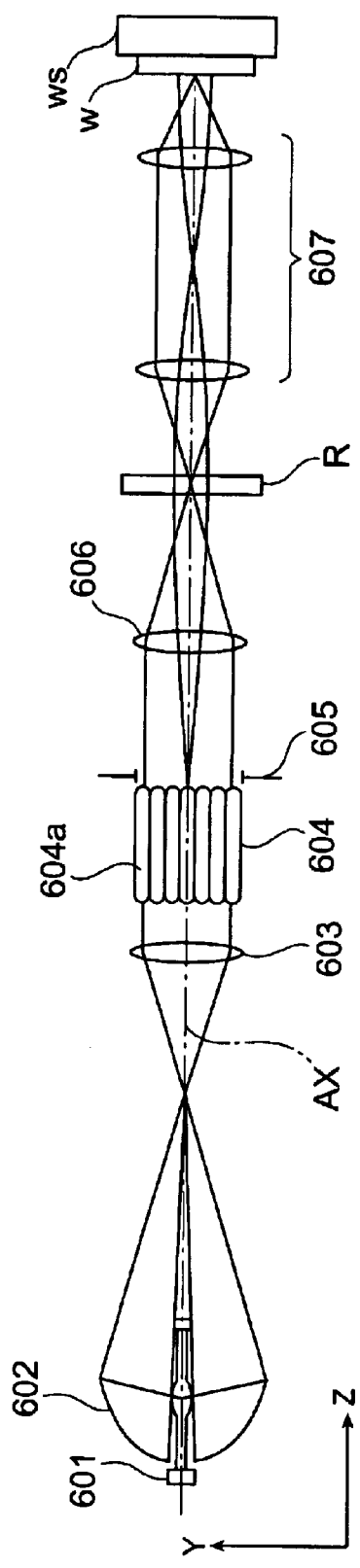
FIG. 22A is a schematic structural diagram to show an example of the conventional projection exposure apparatus and FIG. 22B is a cross-sectional view to show an example of the fly's eye lens used in the projection exposure apparatus of FIG. 22A.
Figure 22B:
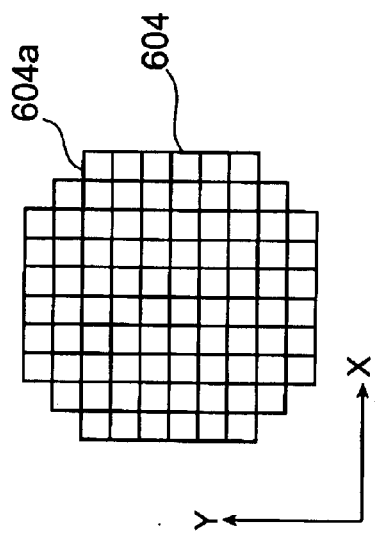

The blocks K and L obtained in this way were heated to 400° C. by use of the thermal treatment apparatus illustrated in FIG. 5 and retained thereat for 30 minutes. After that, they were cooled at the temperature decrease rate of 280° C./h in the furnace. The relation between surface temperature of the blocks and time in this step is presented in FIG. 20. Distributions of signed birefringence values of the blocks K and L obtained in this way are presented in FIG. 21B. The block K demonstrated the distribution of signed birefringence values monotonically increasing in the radial direction from the center to a maximum and then monotonically decreasing after the maximum, and the maximum was +1.7 nm/cm. The block L demonstrated the distribution of signed birefringence values monotonically decreasing in the radial direction from the center, and the minimum was −1.8 nm/cm.

The projection exposure apparatus was fabricated, using the blocks K and L obtained in this way, and the resolution thereof was evaluated in the same manner as in Example 1. The processing line width was 0.39 µm, thus failing to achieve sufficient resolution.

INDUSTRIAL APPLICABILITY

As described above, the production method of the present invention enables the synthetic silica glass with sufficiently homogeneous distribution of signed birefringence values to be produced efficiently and surely, and application of the synthetic silica glass obtained in this way to the optical members of lenses and others forming the optical system makes it feasible to attain sufficiently high imaging performance of the optical system even with use of the light source of short wavelength such as the KrF excimer laser or the ArF excimer laser and to achieve sufficiently high resolution of the projection exposure apparatus. Further, application of the thermal treatment apparatus of the present invention to the above production method of the present invention enables the synthetic silica glass with the above characteristics to be produced efficiently and surely.

What is claimed is:

1. A production method of synthetic silica glass comprising:

a first step of ejecting a silicon compound and a combustion gas containing oxygen and hydrogen from a burner to hydrolyze the silicon compound in oxyhydrogen flame to produce fine particles of silica glass and thereafter depositing and vitrifying said fine particles of silica glass on a target opposed to said burner to obtain a synthetic silica glass ingot;

a second step of heating the synthetic silica glass ingot obtained in the first step or a synthetic silica glass block obtained by cutting of said synthetic silica glass ingot, up to a first retention temperature within a range of not less than 900° C., retaining the ingot or the block at the first retention temperature for a predetermined time, and thereafter cooling the ingot or the block at a temperature decrease rate of not more than 10° C./h down to a temperature of not more than 500° C.; and a third step of heating the synthetic silica glass ingot or the synthetic silica glass block obtained in the second step, up to a second retention temperature within a range of not less than 500° C. nor more than 1100° C., retaining the ingot or the block at the second retention temperature for a predetermined time, and thereafter cooling the ingot or the block at a temperature decrease rate of not less than 50° C./h down to a temperature 100° C. lower than said second retention temperature.

2. A production method of synthetic silica glass according to claim 1, wherein the temperature decrease rate in the third step is not less than 70° C./h nor more than 800° C./h.

3. A production method of synthetic silica glass according to claim 1, wherein a common furnace is used in the second step and in the third step, and the third step is carried out continuously without taking the synthetic silica glass ingot or the synthetic silica glass block out of the furnace, after the second step.

4. A production method of synthetic silica glass according to claim 1, wherein said third step comprises a step of successively carrying out the heating, retaining, and cooling with rotating the synthetic silica glass ingot or the synthetic silica glass block.

* * * * *